(12) United States Patent
Nishizaki

(10) Patent No.: US 11,061,632 B2
(45) Date of Patent: Jul. 13, 2021

(54) COMPUTER-READABLE MEDIUM, INFORMATION PROCESSING DEVICE, AND COMMUNICATION SYSTEM FOR PROVIDING A RESULT OF A PROCESS TO CHANGE SETTING VALUES FOR PRINTERS

(71) Applicant: BROTHER KOGYO KABUSHIKI KAISHA, Nagoya (JP)

(72) Inventor: Takashi Nishizaki, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 16/891,522

(22) Filed: Jun. 3, 2020

(65) Prior Publication Data
US 2020/0379693 A1 Dec. 3, 2020

(30) Foreign Application Priority Data
Jun. 3, 2019 (JP) .............................. JP2019-103849

(51) Int. Cl.
*G06F 3/12* (2006.01)

(52) U.S. Cl.
CPC .......... *G06F 3/1231* (2013.01); *G06F 3/1203* (2013.01); *G06F 3/1225* (2013.01); *G06F 3/1243* (2013.01); *G06F 3/1273* (2013.01)

(58) Field of Classification Search
None
See application file for complete search history.

(56) References Cited

U.S. PATENT DOCUMENTS 7,480,936 B2 * 1/2009 Lyon .................... H04L 63/0272
705/51
7,814,191 B2 * 10/2010 Komlenic ............... H04L 43/16
709/223

(Continued)

FOREIGN PATENT DOCUMENTS

JP 2017-536598 A 12/2017
WO WO 2016/048417 A1 3/2016

*Primary Examiner* — Henok Shiferaw
(74) *Attorney, Agent, or Firm* — Scully, Scott, Murphy & Presser, PC

(57) ABSTRACT

A non-transitory computer-readable medium stores computer-readable program instructions configured to, when executed, cause a processor to transmit, to a terminal device via a communication interface, screen data representing a screen including specific identification information specifying one or more printers and being configured to receive a change instruction to change one or more setting values for the one or more printers to a specific setting value, after receiving the change instruction via the communication interface, transmit a change request including the change instruction and the specific identification information via the communication interface, obtain execution status information including the specific identification information and success-failure information each piece of which represents whether a setting value for a corresponding printer has been changed to the specific setting value, and transmit, to the terminal device via the communication interface, screen data representing a screen including the specific identification information and the execution status information.

15 Claims, 21 Drawing Sheets

(56) References Cited

U.S. PATENT DOCUMENTS 8,719,811 B2 * 5/2014 Vulugundam ..... H04N 1/00323
717/173
2016/0088026 A1 * 3/2016 Mohamad Abdul ........................
H04L 47/125
726/1

* cited by examiner

1st ASSOCIATION TABLE

| SERIAL NUMBER | MODEL NAME |
|---|---|
| 12345 | A001 |
| 23456 | A001 |
| 34567 | A001 |
| 45678 | A002 |

2nd ASSOCIATION TABLE

| Model Name | COMMANDS | | | |
|---|---|---|---|---|
| | Update of Firmware | Setting of Print Density | Obtainment of Status Information | |
| A001 | COMMAND A | COMMAND B | COMMAND C | ... |
| A002 | COMMAND D | COMMAND E | COMMAND J | |
| A003 | COMMAND D | COMMAND G | COMMAND H | |
| ⋮ | | ⋮ | | |

FIG. 3

MANAGEMENT DATABASE

| Serial Number | Model Name | Internal Identification Number | Branch Name | Mac Address | Version Information | Print Settings | | | Error Log Information | | Connection Log Information | Update Date and Time |
|---|---|---|---|---|---|---|---|---|---|---|---|---|
| | | | | | | Density (5 Levels) | Sheet Type | ... | Cover Open | ... | | |
| 12345 | A001 | ABCD | Branch A | 11.22.33 | Ver. 1.31 | 5 | A | ... | | ... | | 2019.05.21 9:30 |
| 23456 | A001 | ABCD | Branch A | 22.33.44 | Ver. 1.21 | 3 | B | ... | | ... | | 2019.05.21 9:30 |
| 34567 | A001 | ABCD | Branch A | 33.44.55 | Ver. 1.22 | 2 | B | ... | | ... | | 2019.05.21 9:30 |
| 45678 | A001 | ABCD | Branch A | 12.23.34 | Ver. 2.20 | 2 | B | ... | | ... | | 2019.05.21 9:30 |
| 56789 | A002 | EFGH | Branch B | 23.34.45 | Ver. 1.00 | 3 | C | ... | | ... | | 2019.05.21 9:30 |
| 67890 | A002 | EFGH | Branch B | 34.45.56 | Ver. 1.20 | 4 | D | ... | | ... | | 2019.05.21 9:30 |
| 78901 | A003 | JKLM | Branch C | 44.55.66 | Ver. 3.10 | 3 | E | ... | | ... | | 2019.05.21 9:30 |
| 89012 | A003 | JKLM | Branch C | 55.66.77 | Ver. 3.12 | 5 | E | ... | | ... | | 2019.05.21 9:30 |
| 90123 | A003 | JKLM | Branch C | 45.56.67 | Ver. 2.11 | 2 | E | ... | | ... | | 2019.05.21 9:30 |
| ... | ... | ... | ... | ... | ... | ... | ... | ... | ... | ... | ... | ... |

3rd DISPLAY SCREEN
| Model Name | Serial Number | Firmware Ver. | Mac Address | ... |
|---|---|---|---|---|
| A001 | 12345 | 1.31 | ... | |
| A001 | 23456 | 1.21 | ... | |
| A001 | 34567 | 1.22 | ... | |
| A001 | 45678 | 2.20 | ... | |
| A001 | 01234 | 1.22 | ... | |
| A001 | 98765 | 1.31 | ... | |
| A001 | 87654 | 1.00 | ... | |
| A001 | 76543 | 1.22 | ... | |
Execute — 76
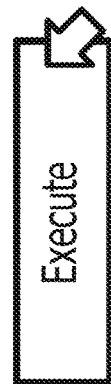
Back — 77
FIG. 12A

5th DISPLAY SCREEN
Firmware Update Results

| Model Name | Serial Number | Firmware Ver. | Update | Cause |
|---|---|---|---|---|
| A001 | 12345 | 2.20 | Done | — |
| A001 | 23456 | 1.21 | Not Yet | Offline |
| A001 | 34567 | 2.20 | Done | — |
| A001 | 45678 | 2.20 | — | — |
| A001 | 01234 | 1.22 | Not Yet | Offline |
| A001 | 98765 | 1.31 | Not Yet | Cover Open |
| A001 | 87654 | 2.20 | Done | — |
| A001 | 76543 | 2.20 | Done | — |
| ... | ... | ... | ... | ... |

Display Non-Updated Only

End

FIG. 12B

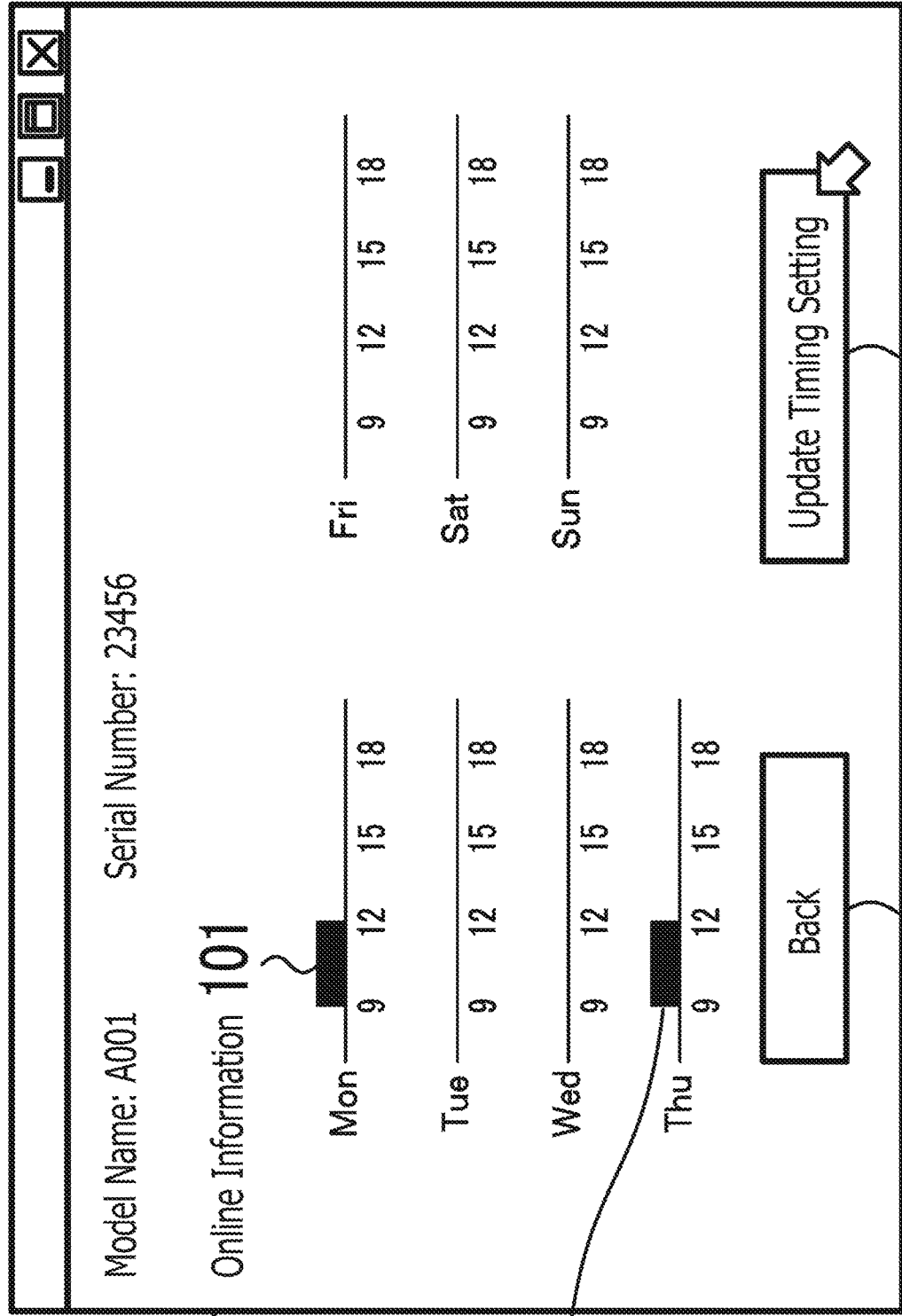

FIG. 15A

10th DISPLAY SCREEN
Synchronization Checking

| Model Name | Serial Number | Firmware Ver. | Synchronization | Checking Date and Time |
|---|---|---|---|---|
| A001 | 12345 | 2.20 | OK | 2019.05.21 9:30 |
| A001 | 23456 | 1.21 | NG | 2019.05.21 9:30 |
| A001 | 34567 | 2.20 | OK | 2019.05.21 9:30 |
| A001 | 45678 | 2.20 | OK | 2019.05.21 9:30 |
| A001 | 01234 | 1.22 | NG | 2019.05.21 9:30 |
| A001 | 98765 | 1.31 | NG | 2019.05.21 9:30 |
| A001 | 87654 | 2.20 | OK | 2019.05.21 9:30 |
| A001 | 76543 | 2.20 | OK | 2019.05.21 9:30 |
| : | : | : | : | : |
| : | : | : | : | : |
| : | : | : | : | : |

☐ Display Unsynchronized Only — 106

OK — 107

20

COMPUTER-READABLE MEDIUM, INFORMATION PROCESSING DEVICE, AND COMMUNICATION SYSTEM FOR PROVIDING A RESULT OF A PROCESS TO CHANGE SETTING VALUES FOR PRINTERS

CROSS-REFERENCE TO RELATED APPLICATION

This application claims priority under 35 U.S.C. § 119 from Japanese Patent Application No. 2019-103849 filed on Jun. 3, 2019. The entire subject matter of the application is incorporated herein by reference.

BACKGROUND

Technical Field

Aspects of the present disclosure are related to a non-transitory computer-readable medium, an information processing device, and a communication system for providing a result of a process to change setting values for printers.

Related Art

An MDM ("MDM" is an abbreviation of "Mobile Device Management") system has been known in which a management server on the Internet communicates with mobile devices to manage the mobile devices. The mobile devices may include, but are not limited to, mobile phones, tablet computers, notebook personal computers, and printers.

An administrator of the mobile devices accesses the management server from a terminal device (e.g., a personal computer and a tablet computer) to manage statuses of the mobile devices and provide an instruction to the mobile devices.

SUMMARY

The aforementioned known system does not disclose sufficient information on a technique that enables the administrator to recognize a result of a process by the administrator to change setting values for the mobile devices.

Aspects of the present disclosure are advantageous to provide one or more improved techniques that enable an administrator to easily recognize a result of a process by the administrator to change setting values for printers.

According to aspects of the present disclosure, a non-transitory computer-readable medium is provided, which stores computer-readable program instructions executable by a processor connected with an information processing device including a communication interface. The program instructions are configured to, when executed by the processor, cause the processor to transmit first screen data representing a first screen to a terminal device via the communication interface, the first screen being configured to receive inputs of specific information for specifying one or more printers and a specific setting value settable for the one or more printers, receive the specific information and the specific setting value from the terminal device via the communication interface, specify, as specific identification information, printer identification information associated with the received specific information among all pieces of printer identification information registered on a database, transmit second screen data representing a second screen to the terminal device via the communication interface, the second screen including the specific identification information and one or more setting values associated with the specific identification information on the database, the second screen being configured to receive an input of a change instruction to change the one or more setting values to the specific setting value, receive the change instruction from the terminal device via the communication interface, transmit a change request via the communication interface, the change request including the change instruction and the specific identification information, obtain execution status information including the specific identification information and success-failure information, each piece of the success-failure information representing whether a setting value for a corresponding printer, among the one or more setting values, has been changed to the specific setting value in accordance with the change instruction, and transmit third screen data representing a third screen to the terminal device via the communication interface, the third screen including the specific identification information and the execution status information.

According to aspects of the present disclosure, further provided is a non-transitory computer-readable medium storing computer-readable program instructions executable by a processor connected with an information processing device including a communication interface. The program instructions are configured to, when executed by the processor, cause the processor to transmit first screen data representing a first screen to a terminal device via the communication interface, the first screen being configured to receive inputs of specific information for specifying one or more printers and a specific setting value settable for the one or more printers, receive the specific information and the specific setting value from the terminal device via the communication interface, specify, as specific identification information, printer identification information associated with the received specific information among all pieces of printer identification information registered on a database, transmit second screen data representing a second screen to the terminal device via the communication interface, the second screen including the specific identification information and one or more setting values associated with the specific identification information on the database, the second screen being configured to receive an input of a maintenance instruction to maintain the one or more setting values to be the specific setting value, receive the maintenance instruction from the terminal device via the communication interface, receive status information via the communication interface, the status information including the one or more setting values for the one or more printers, determine whether each of the one or more setting values included in the received status information is identical to the specific setting value, when determining that a setting value, among the one or more setting values, is not identical to the specific setting value, transmit a change request via the communication interface, the change request including specific identification information associated with the setting value determined not to be identical to the specific setting value, a change instruction to change the setting value to the specific setting value, and the specific setting value, and obtain execution status information including the specific identification information and success-failure information, each piece of the success-failure information representing whether a setting value for a corresponding printer, among the one or more setting values, has been changed to the specific setting value in accordance with the change instruction, and transmit third screen data representing a third screen to the terminal device via the communication interface, the third screen including the specific identification information and the execution status information.

According to aspects of the present disclosure, further provided is an information processing device including a communication interface and a controller. The controller is configured to transmit first screen data representing a first screen to a terminal device via the communication interface, the first screen being configured to receive inputs of specific information for specifying one or more printers and a specific setting value settable for the one or more printers, receive the specific information and the specific setting value from the terminal device via the communication interface, specify, as specific identification information, printer identification information associated with the received specific information among all pieces of printer identification information registered on a database, transmit second screen data representing a second screen to the terminal device via the communication interface, the second screen including the specific identification information and one or more setting values associated with the specific identification information on the database, the second screen being configured to receive an input of a change instruction to change the one or more setting values to the specific setting value, receive the change instruction from the terminal device via the communication interface, transmit a change request via the communication interface, the change request including the change instruction and the specific identification information, obtain execution status information including the specific identification information and success-failure information, each piece of the success-failure information representing whether a setting value for a corresponding printer, among the one or more setting values, has been changed to the specific setting value in accordance with the change instruction, and transmit third screen data representing a third screen to the terminal device via the communication interface, the third screen including the specific identification information and the execution status information.

According to aspects of the present disclosure, further provided is a communication system including a management server and an intermediary device communicably connected with the management server. The management server includes a first communication interface and a first controller. The first controller is configured to transmit first screen data representing a first screen to a terminal device via the first communication interface, the first screen being configured to receive inputs of specific information for specifying one or more printers and a specific setting value settable for the one or more printers, receive the specific information and the specific setting value from the terminal device via the first communication interface, specify, as specific identification information, printer identification information associated with the received specific information among all pieces of printer identification information registered on a database, transmit second screen data representing a second screen to the terminal device via the first communication interface, the second screen including the specific identification information and one or more setting values associated with the specific identification information on the database, the second screen being configured to receive an input of a change instruction to change the one or more setting values to the specific setting value, receive the change instruction from the terminal device via the first communication interface, transmit a change request via the first communication interface, the change request including the change instruction and the specific identification information, obtain execution status information including the specific identification information and success-failure information, each piece of the success-failure information representing whether a setting value for a corresponding printer, among the one or more setting values, has been changed to the specific setting value in accordance with the change instruction, and transmit third screen data representing a third screen to the terminal device via the first communication interface, the third screen including the specific identification information and the execution status information. The intermediary device includes a second communication interface and a second controller. The second controller is configured to receive the change instruction via the second communication interface, establish communication with the one or more printers, transmit the received change instruction to the one or more printers via the second communication interface, receive affirmative information or negative information from each of the one or more printers via the second communication interface, each piece of the affirmative information representing that a setting value for a corresponding printer has been changed to the specific setting value, each piece of the negative information representing that a setting value for a corresponding printer has not been changed to the specific setting value, and transmit the success-failure information to the management server via the second communication interface, each piece of the success-failure information including the affirmative information, the negative information, or offline information representing that the communication has not been established with a corresponding printer.

BRIEF DESCRIPTION OF THE ACCOMPANYING DRAWINGS

FIG. 3 shows an example of a management database in the illustrative embodiment according to one or more aspects of the present disclosure.

Figure 5:
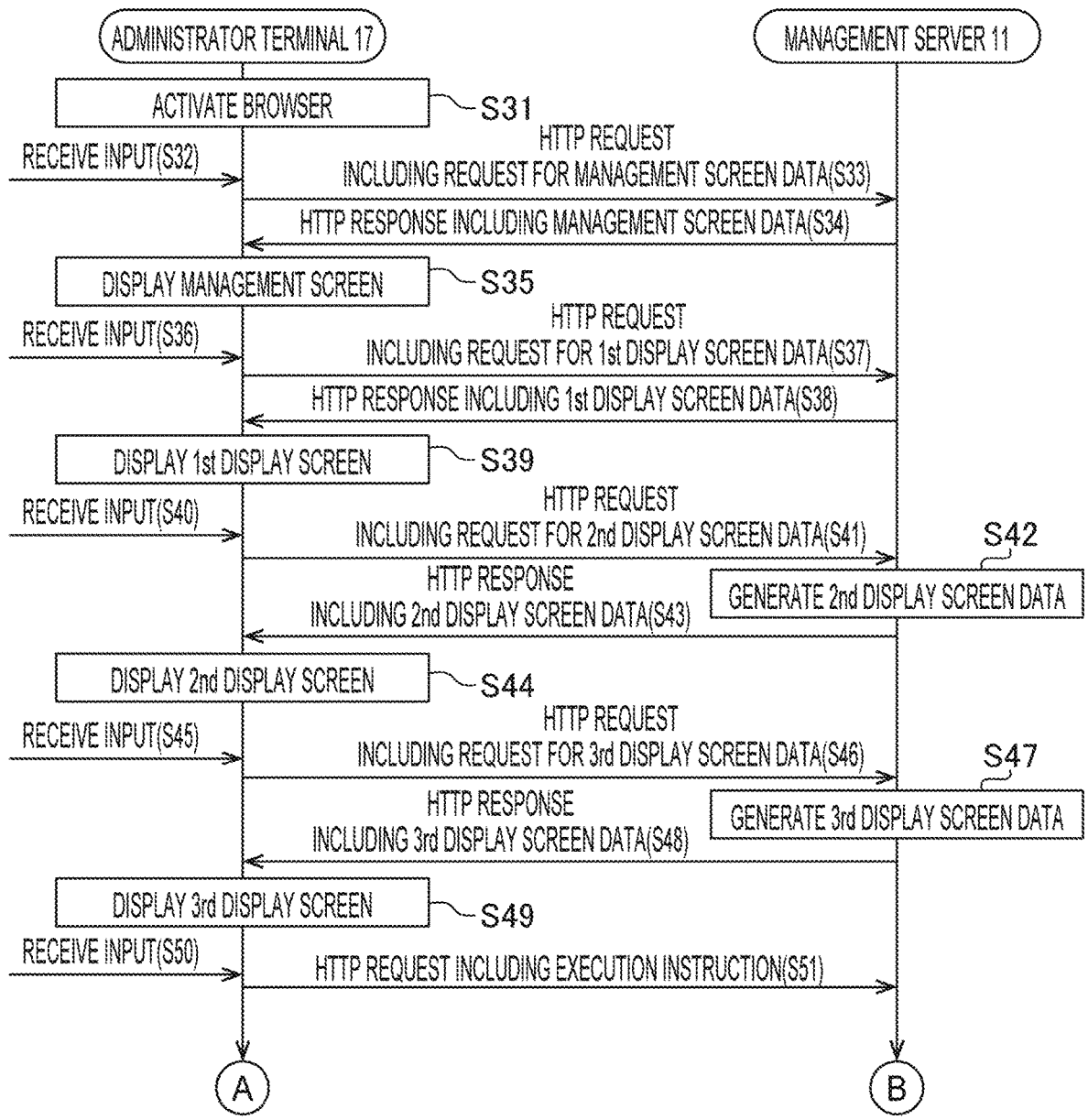
Figure 6:
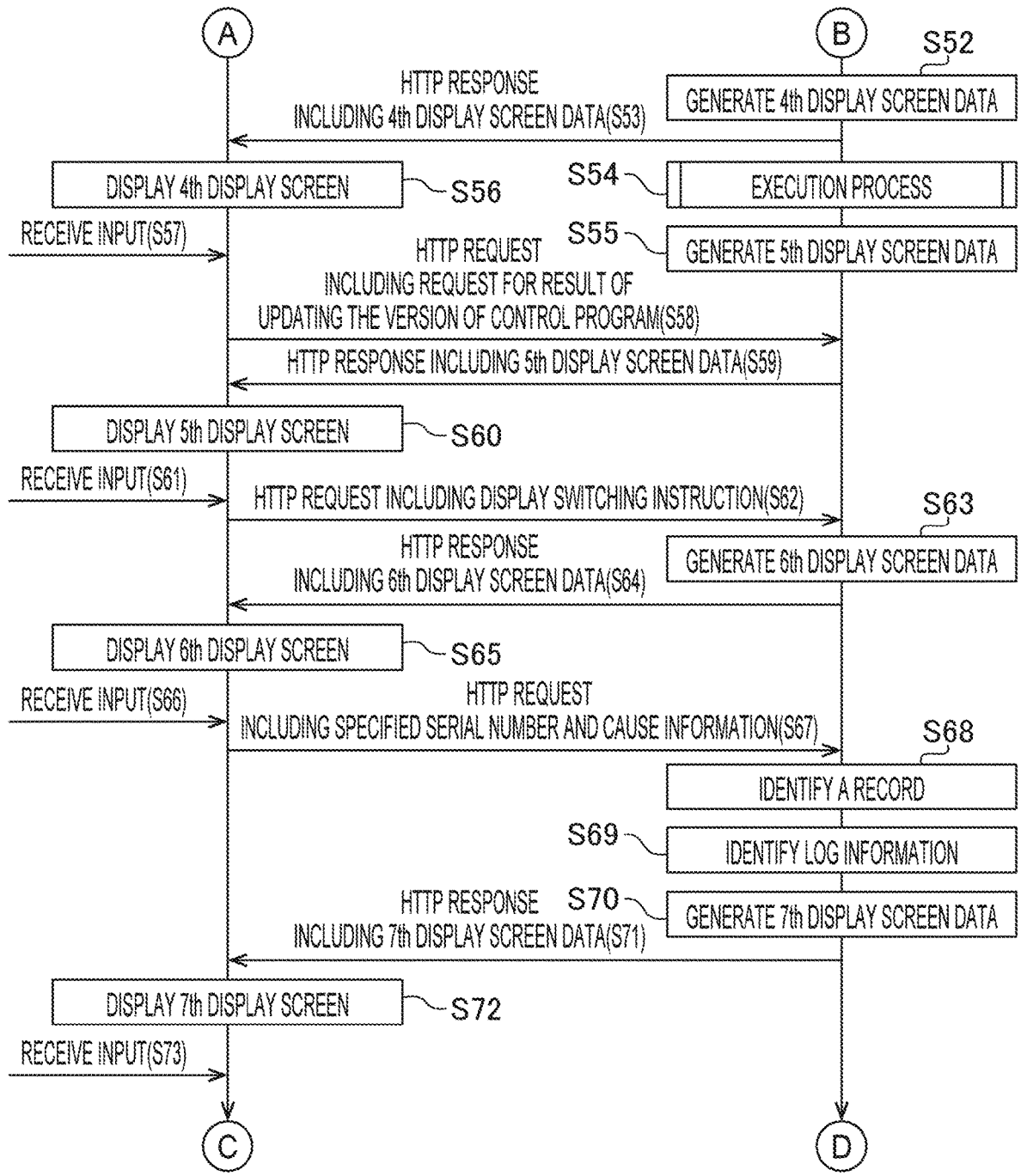
Figure 7:
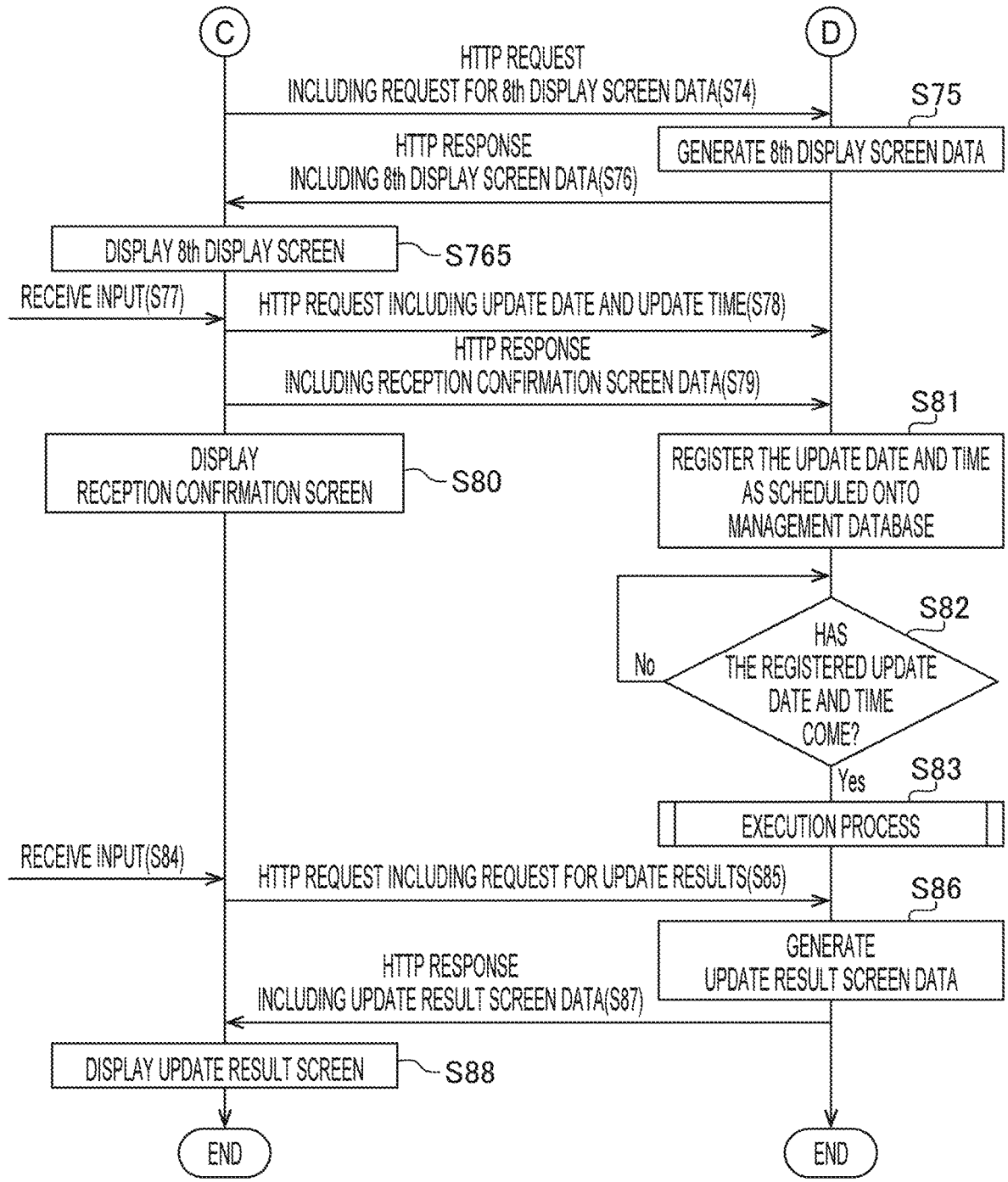

FIGS. 5, 6, and 7 show a sequence of processes to be performed by an administrator terminal and the management server to change a version of a control program of each printer to another version, in the illustrative embodiment according to one or more aspects of the present disclosure.

Figure 8:
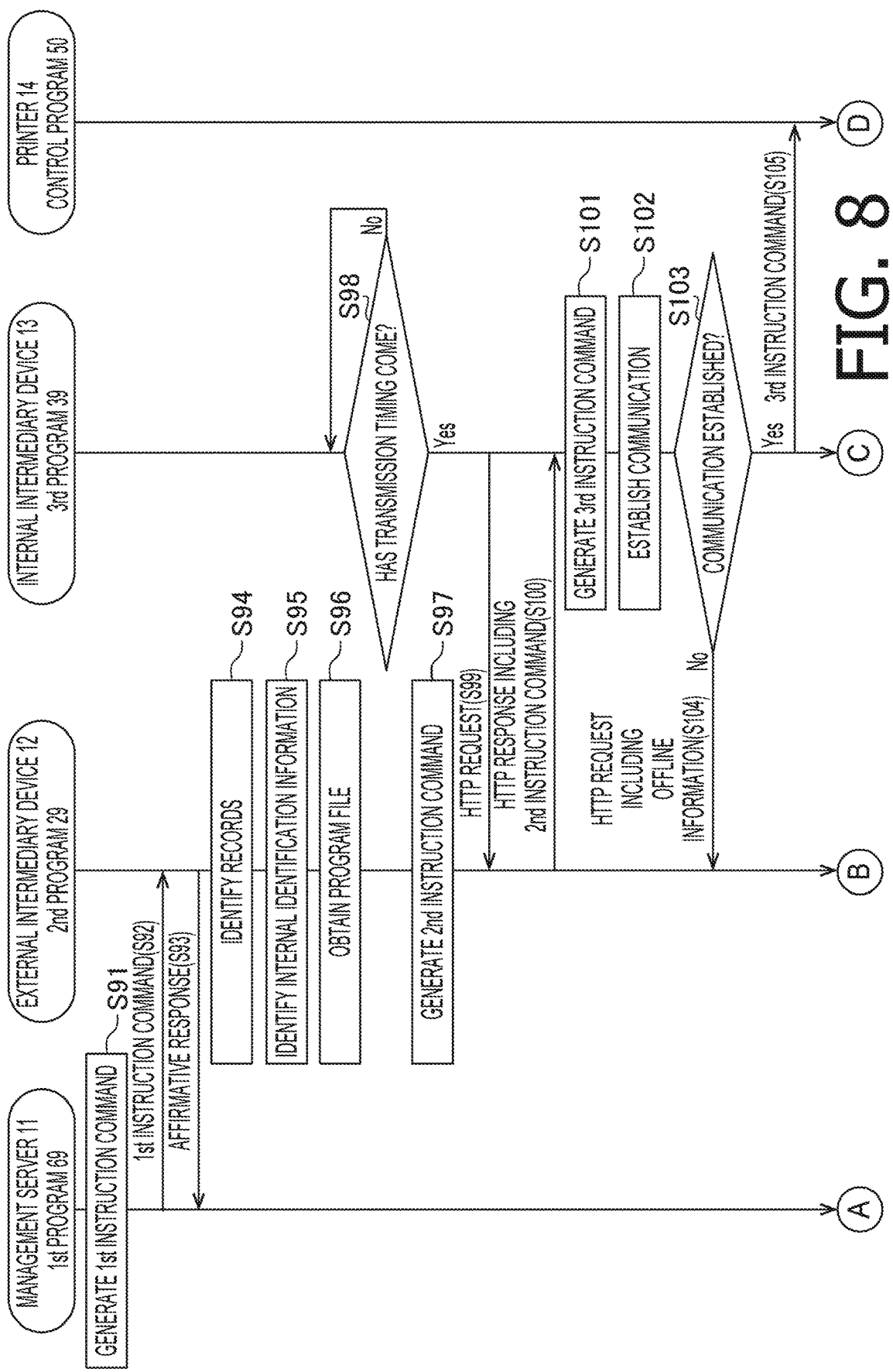
Figure 9:
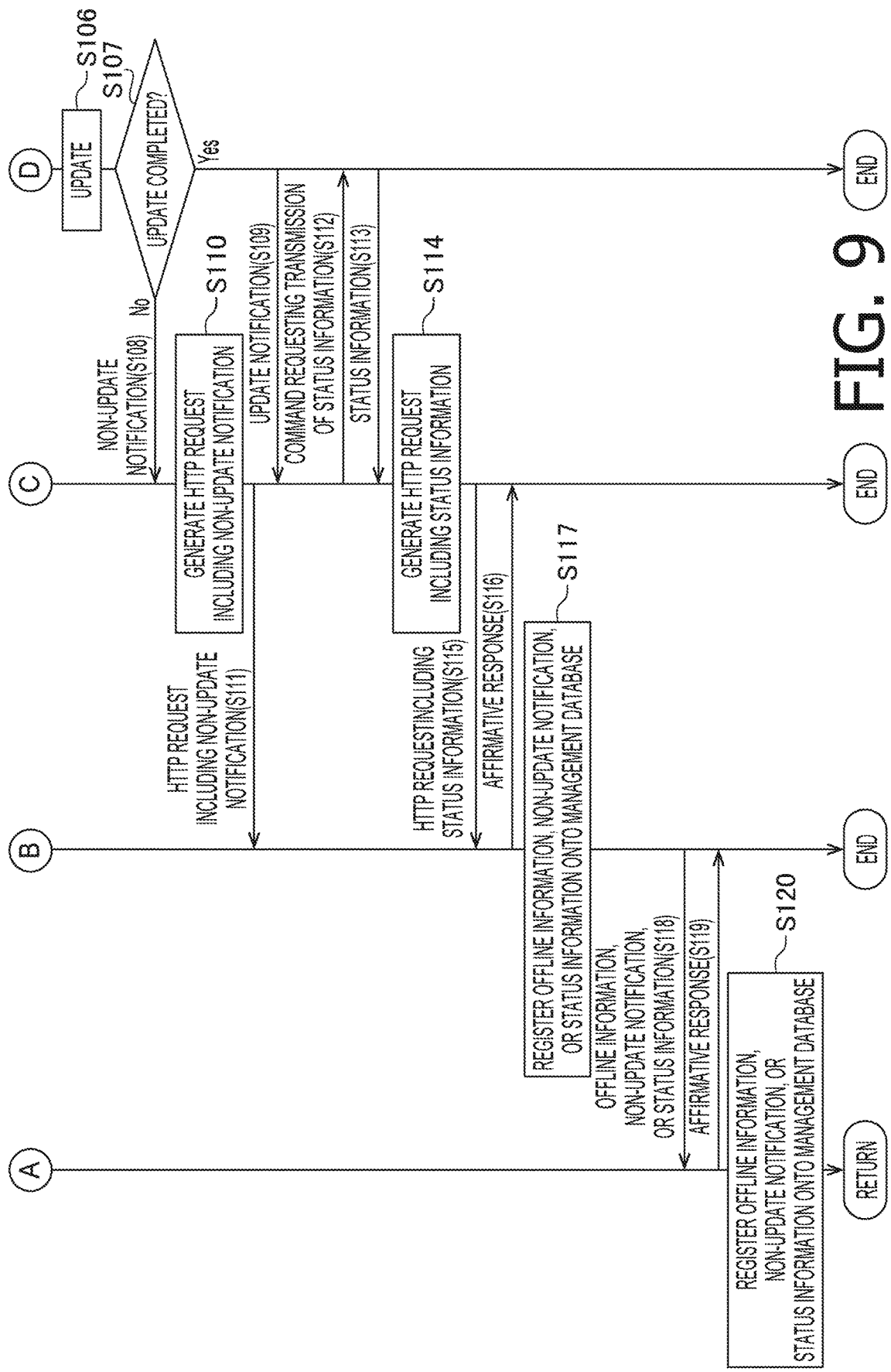

FIGS. 8 and 9 show a procedure of an execution process to be performed by the management server, the external intermediary device, each internal intermediary device, and each printer, in the illustrative embodiment according to one or more aspects of the present disclosure.

Figure 10:
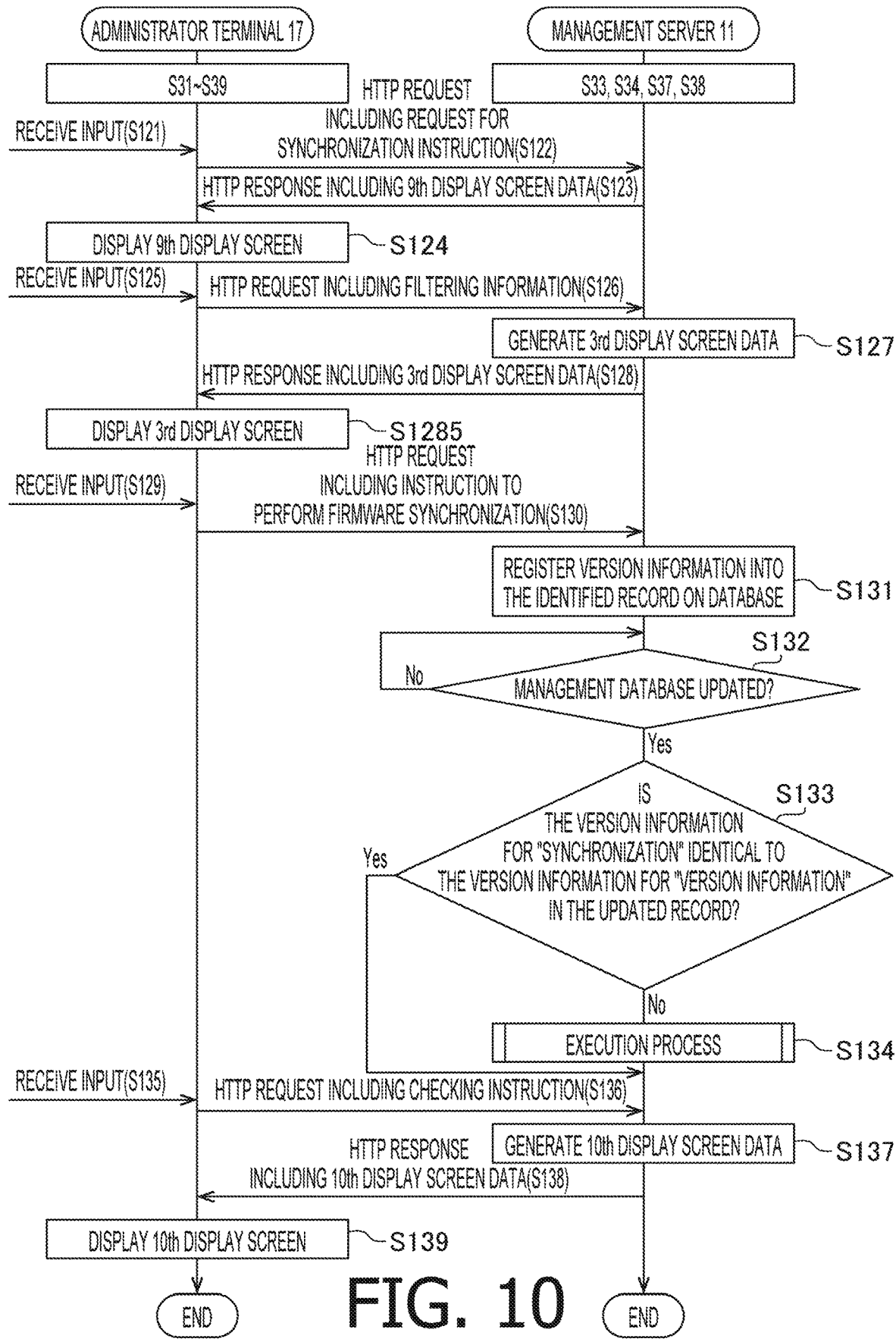

FIG. 10 shows a procedure of a synchronization process to be performed by the administrator terminal and the management server, in the illustrative embodiment according to one or more aspects of the present disclosure.

Figure 11A:
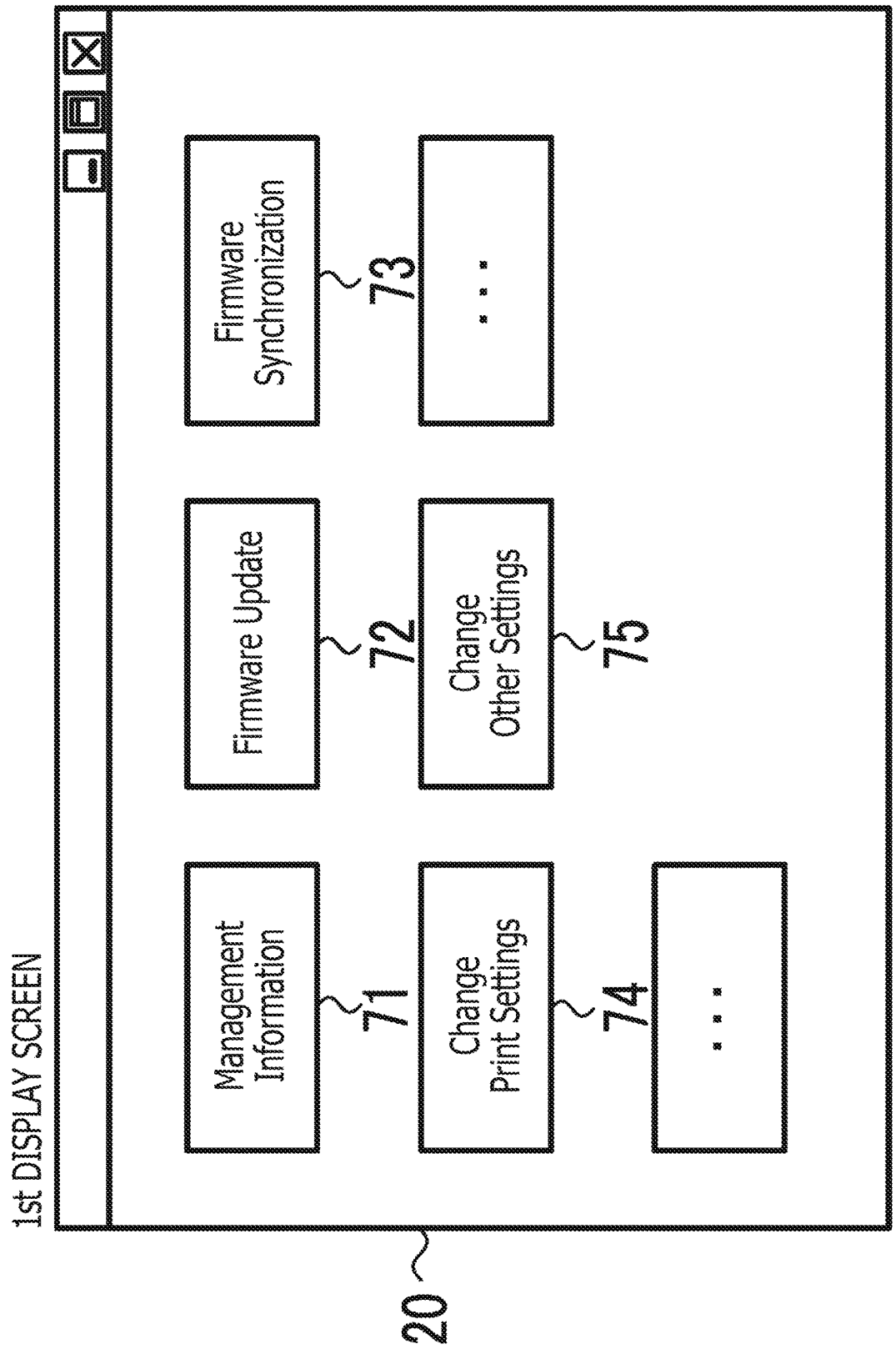

FIG. 11A shows an example of a first display screen displayed on a display of the administrator terminal, in the illustrative embodiment according to one or more aspects of the present disclosure.

Figure 11B:
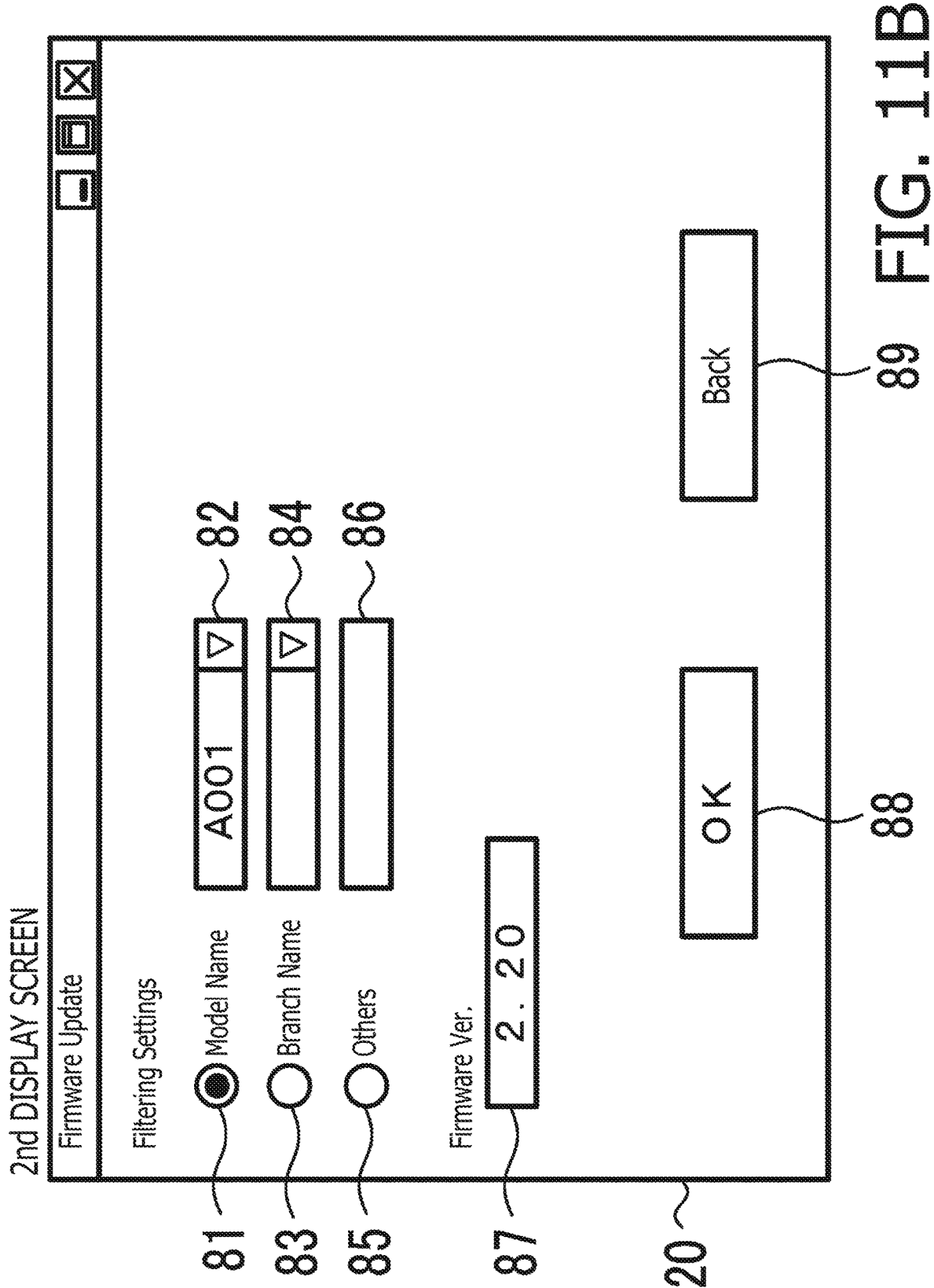

FIG. 11B shows an example of a second display screen displayed on the display of the administrator terminal, in the illustrative embodiment according to one or more aspects of the present disclosure.

FIG. 12A shows an example of a third display screen displayed on the display of the administrator terminal, in the illustrative embodiment according to one or more aspects of the present disclosure.

FIG. 12B shows an example of a fifth display screen displayed on the display of the administrator terminal, in the illustrative embodiment according to one or more aspects of the present disclosure.

Figure 13A:
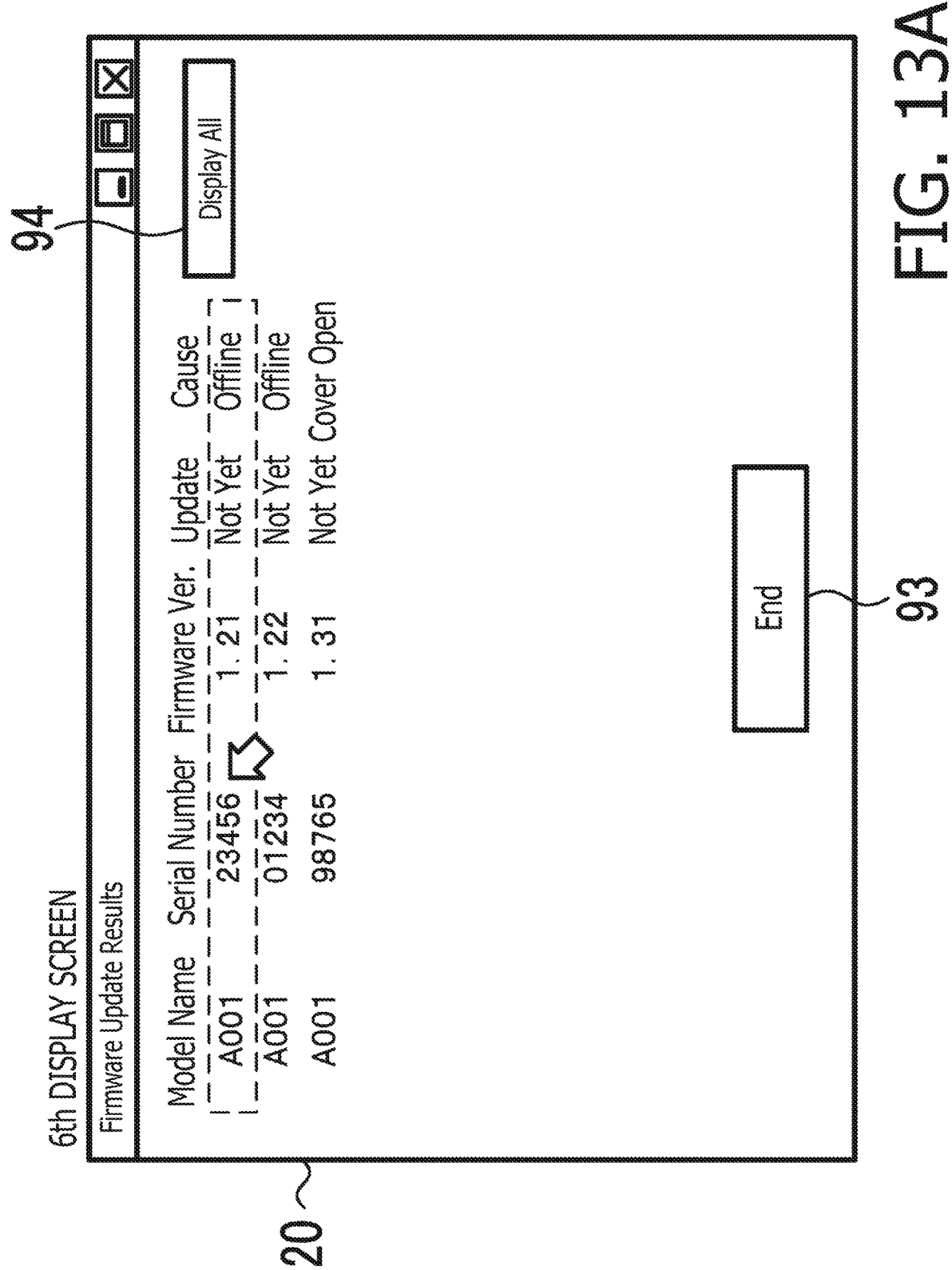

FIG. 13A shows an example of a sixth display screen displayed on the display of the administrator terminal, in the illustrative embodiment according to one or more aspects of the present disclosure.

FIG. 13B shows an example of a seventh display screen displayed on the display of the administrator terminal, in the illustrative embodiment according to one or more aspects of the present disclosure.

Figure 14A:
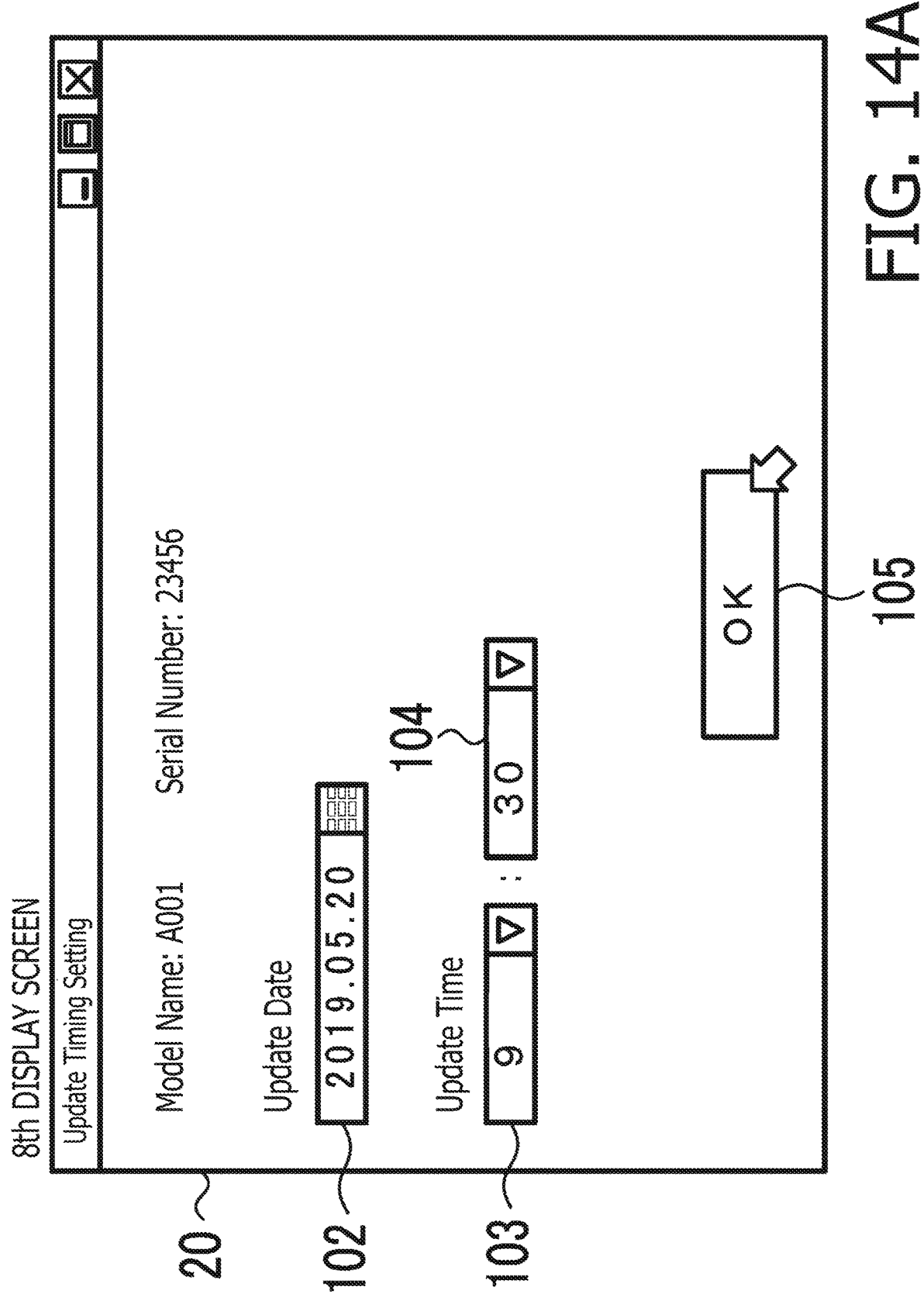

FIG. 14A shows an example of an eighth display screen displayed on the display of the administrator terminal, in the illustrative embodiment according to one or more aspects of the present disclosure.

Figure 14B:

FIG. 14B shows an example of a ninth display screen displayed on the display of the administrator terminal, in the illustrative embodiment according to one or more aspects of the present disclosure.

FIG. 15A shows an example of a tenth display screen displayed on the display of the administrator terminal, in the illustrative embodiment according to one or more aspects of the present disclosure.

Figure 15B:
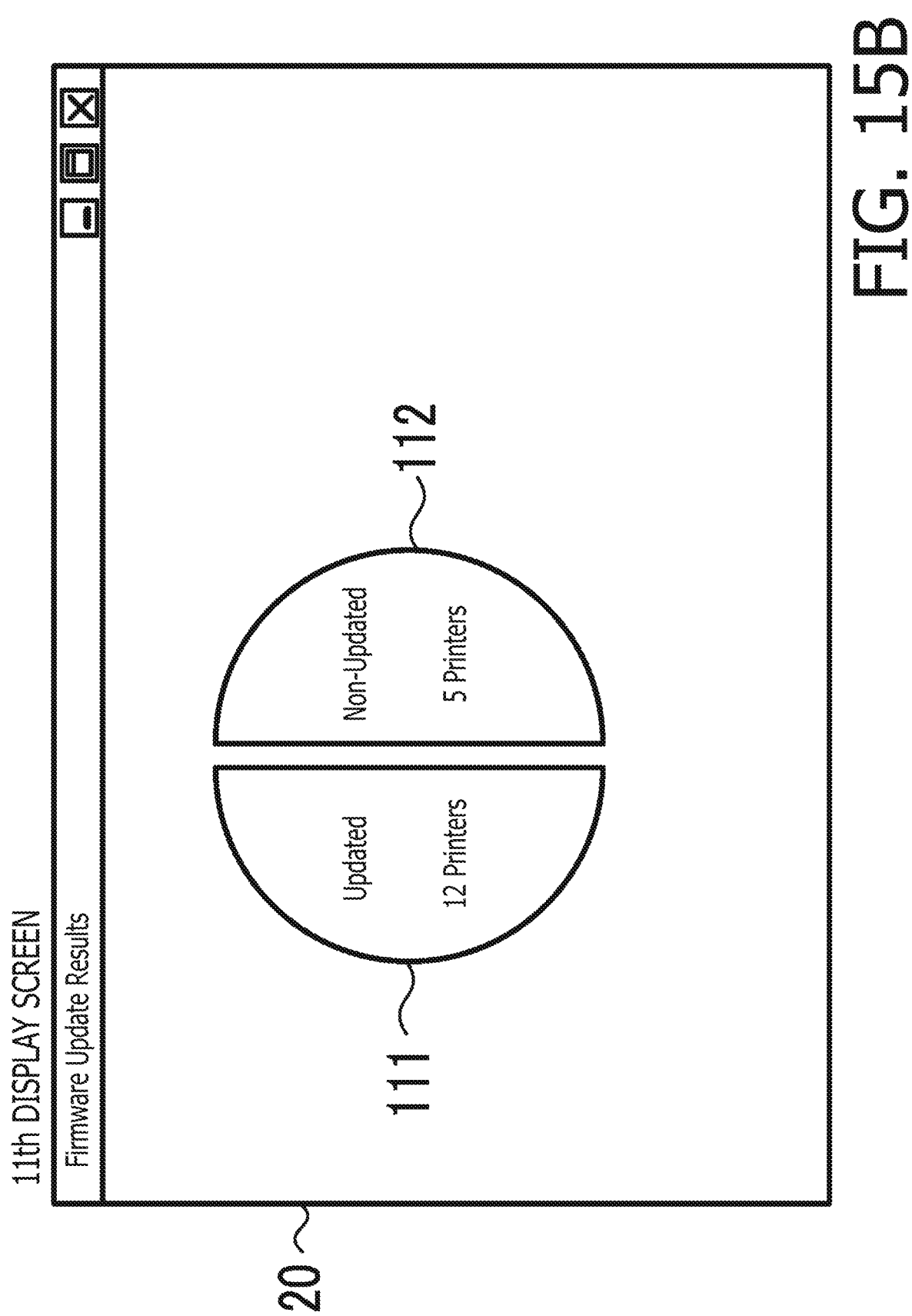

FIG. 15B shows an example of an eleventh display screen displayed on the display of the administrator terminal, in the illustrative embodiment according to one or more aspects of the present disclosure.

Figure 16:
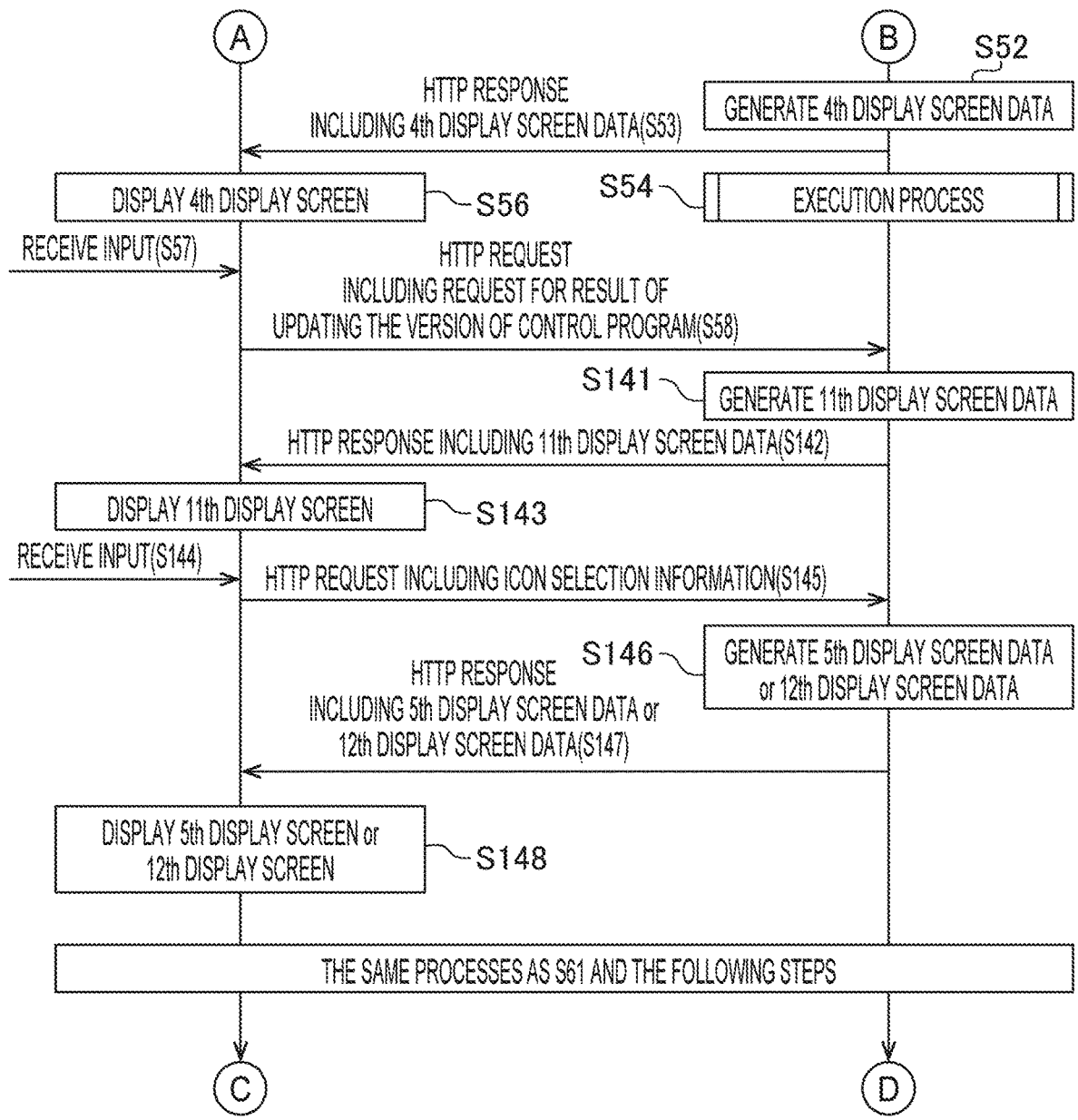

FIG. 16 shows a sequence of processes to be performed by the administrator terminal and the management server, in a modification according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

In the illustrative embodiment, an example will be described in which a communication system 10 (see FIG. 1) provides a business operator with a service for managing one or more printers 14 used in each of a plurality of branches of the business operator.

The communication system 10 uses an MDM system that provides the business operator with a service for managing mobile devices (e.g., a mobile terminal 9 and mobile printers). Specifically, the communication system 10 uses a management server 11 that manages the mobile devices communicable with other devices via an Internet 15. The communication system 10 includes an external intermediary device 12 and one or more internal intermediary devices 13 as well as the management server 11 in such a manner that the management server 11 is allowed to manage the one or more printers 14. As will be described in detail later, each printer 14 is a mobile device not having a configuration for communicating with other devices via the Internet 15. In other words, each printer 14 is a mobile device that is unable to be managed by the management server 11 alone. The communication system 10 includes the external intermediary device 12 and the one or more internal intermediary devices 13. Thus, the communication system 10 is enabled to manage the one or more printers 14.

First, an explanation will be provided of connection of the management server 11, the external intermediary device 12, the one or more internal intermediary device 13, and the one or more printer 14 to a communication network.

The management server 11 and the external intermediary device 12 are communicably interconnected via the Internet 15. The management server 11 and the external intermediary device 12 are so-called web servers each having a global IP address and publishing its URL on the Internet 15.

Each internal intermediary device 13 is communicably connected with one or more printers 14 via a local network 16 established at a corresponding one of the branches. For instance, one internal intermediary device 13 is communicably connected with one or more printers 14 via a local network 16 provided in a branch A. Further, another internal intermediary device 13 is communicably connected with one or more printers 14 via a local network 16 provided in a branch B. Each local network 16 is a so-called intranet. Examples of the local networks 16 may include, but are not limited to, a wired LAN, a wireless LAN, a WAN, and a combination of at least two of them. Each local network 16 is connected with the Internet 15 via a gateway device 18 such as a router or a bridge. Each gateway device 18 transmits, via the Internet 15, an HTTP request transmitted by a corresponding internal intermediary device 13 through a corresponding local network 16. Then, when receiving an HTTP response to the HTTP request via the Internet 15, each gateway device 18 transmits the received HTTP response to the corresponding internal intermediary device 13 via the corresponding local network 16. Namely, each gateway device 18 is configured to establish a so-called firewall. In an example shown in FIG. 1, three local networks 16 are established, each of which is connected with two or three printers 14. However, the number of local networks 16 and the number of printers 14 connected with each local network 16 are not limited to the numbers as illustrated. It is noted that, in FIG. 1, only the gateway device 18 connected with one local network 16 is shown, and the gateway device 18 connected with the other local networks 16 are not shown for a sake of simplicity.

Each printer 14 is communicably connected with the corresponding internal intermediary device 13 via the corresponding local network 16. For instance, the one or more printers 14 belonging to the branch A are communicably connected with the corresponding internal intermediary device 13 via the local network 16 established in the branch A. When a printer 14 is powered off or taken out of a corresponding branch office, the printer 14 is not connected with a corresponding local network 16. For instance, when the printer 14 is placed in the branch office, communicably connected with the local network 16, and powered on, the printer 14 is available. The connection between the printer 14 and the local network 16 may be a wired connection or a wireless LAN connection such as Wi-Fi (registered trademark) or Bluetooth (registered trademark).

Figure 1:
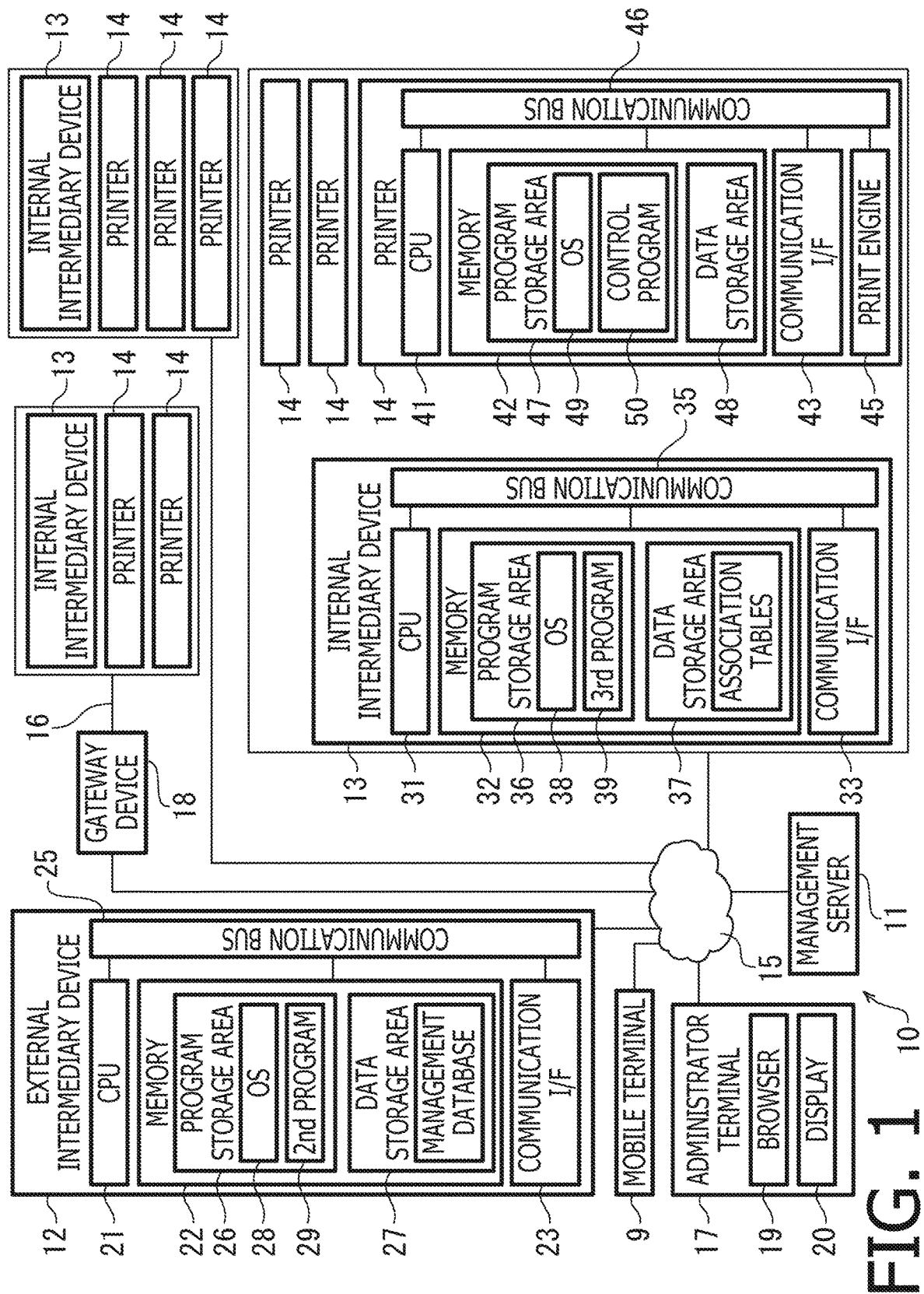
FIG. 1 is a block diagram schematically showing a configuration of a communication system in an illustrative embodiment according to one or more aspects of the present disclosure.

Hereinafter, configurations of each printer 14, the management server 11, the external intermediary device 12, and each internal intermediary device 13 will be described in detail with reference to functional block diagrams shown in FIGS. 1 and 2A.

Each printer 14 is a printer carried and used by a user who is an employee of the aforementioned business operator. Each printer 14 includes a CPU 41, a memory 42, a communication I/F ("I/F" is an abbreviation of "interface") 43, a print engine 45, and a communication bus 46. It is noted that examples of the printers 14 may include, but are not limited to, a label printer and a mobile printer. Each individual printer 14 may be any type of portable printer.

For instance, the print engine 45 includes a feeder configured to feed a label, a head configured to record an image on the label, and a cutter configured to cut the label with the image recorded thereon. The head may be any type of head, such as a head configured to record an image on a label by so-called thermal transfer, and a head configured to record an image on a label by discharging ink.

The CPU 41, the memory 42, the communication I/F 43, and the print engine 45 are interconnected via a communication bus 46. Namely, the CPU 41 is connected with the communication I/F 43 and the print engine 45 via the communication bus 46. The CPU 41 is configured to input information, data, commands, drive signals, and control signals to the communication I/F 43 and the print engine 45 via the communication bus 46. For instance, the CPU 41 may transmit information, data, and commands to the local network 16 via the communication I/F 43, or may receive information, data, and commands from the local network 16 via the communication I/F 43. Further, the CPU 41 may input a drive signal and a control signal to the print engine 45, thereby causing the print engine 45 to record an image on a label.

The memory 42 may include a ROM, a RAM, an EEPROM, an HDD, a portable storage medium such as a USB memory, and a buffer included in the CPU 41. The memory 42 has a program storage area 47 and a data storage area 48. The program storage area 47 stores programs such as an OS 49 and a control program 50. Instructions included in the OS 49 and the control program 50 are executable by the CPU 41. The OS 49 and the control program 50 are executable in parallel, for instance, by multitask processing.

The control program 50 is configured to, when executed, cause the CPU 41 to generate a drive signal and a control signal for recording an image represented by recording data on a label, in response to receipt of a command with the recording data added thereto via the communication I/F 43. Further, the control program 50 may, when executed, cause the CPU 41 to input the generated drive signal and the generated control signal into the print engine 45. The control program 50 may, when executed, cause the CPU 41 to transmit status information stored in the data storage area 48 of the memory 42 via the communication I/F 43, in response to receipt of a command requesting transmission of the status information via the communication I/F 43. Further, the control program 50 may, when executed, cause the CPU 41 to change a setting value of a print setting stored in the data storage area 48 to another setting value added to a command, in response to receipt of the command requesting the printer 14 to change the setting value to the said another setting value added to the command via the communication I/F 43. The status information may include a plurality of pieces of information such as setting values of print settings, the number of times that images have been recorded on the label, and error information.

Figures 2A, 2B, 2C:
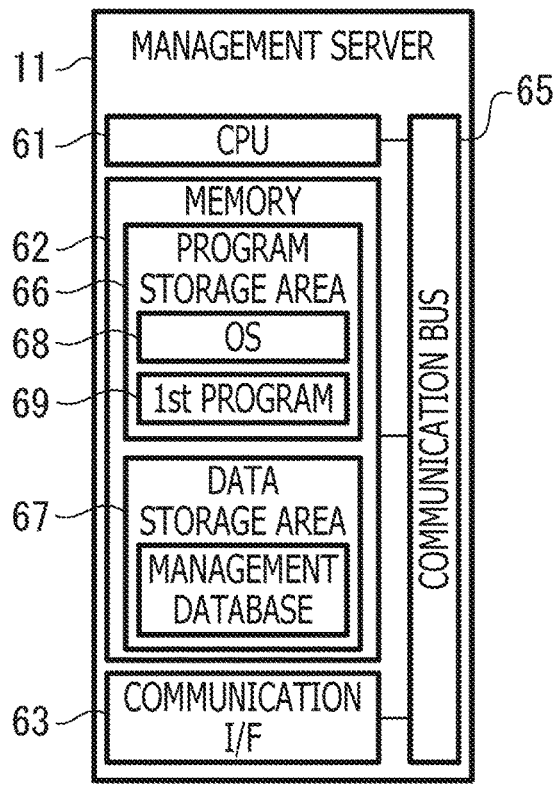
FIG. 2A is a functional block diagram schematically showing a configuration of a management server included in the communication system in the illustrative embodiment according to one or more aspects of the present disclosure.
FIG. 2B shows an example of a first association table stored in each internal intermediary device included in the communication system in the illustrative embodiment according to one or more aspects of the present disclosure.
FIG. 2C shows an example of a second association table stored in each internal intermediary device included in the communication system in the illustrative embodiment according to one or more aspects of the present disclosure.

As shown in FIG. 2A, the management server 11 includes a CPU 61, a memory 62, a communication I/F 63, and a communication bus 65. The CPU 61, the memory 62, the communication I/F 63, and the communication bus 65 have substantially the same configurations as the configurations of the CPU 41, the memory 42, the communication I/F 43, and the communication bus 46 of each printer 14. Hence, detailed explanations thereof will be omitted.

The memory 62 has a program storage area 66 and a data storage area 67. The program storage area 66 stores programs such as an OS 68 and a first program 69. The program storage area 66 and the data storage area 67 have substantially the same configurations as the configurations of the program storage area 47 and the data storage area 48 of each printer 14. Hence, detailed explanations thereof will be omitted. Examples of the OS 68 may include, but are not limited to, MacOS (registered trademark), Windows (registered trademark), Linux (registered trademark), and Android (registered trademark) OS.

The first program 69 is configured to, when executed, cause the CPU 61 to transmit management information to an administrator terminal 17 (e.g., a personal computer and a tablet computer) used by the administrator in response to a request from the administrator terminal 17, or cause the CPU 61 to receive an instruction from the administrator terminal 17. Further, the first program 69 may, when executed, cause the CPU 61 to transmit information, data, or a command to the external intermediary device 12 in accordance with an instruction received from the administrator terminal 17. Further, the first program 69 may, when executed, cause the CPU 61 to register information and data received from the external intermediary device 12 onto a management database (see FIG. 3) stored in the memory 62. The first program 69 may be a single program or an aggregate of a plurality of programs. Details of processing performed by the CPU 61 executing the first program 69 will be described later.

The storage area 67 stores data necessary for execution of the programs. Further, the data storage area 67 contains the management database as shown in FIG. 3.

The management database has a plurality of items and a plurality of records. For instance, the plurality of items may include, but are not limited to, at least two of "Serial Number," "Model Name," "Internal Identification Information," "Branch Name," "Mac Address," "Version Information," "Print Settings," "Error Log Information", "Connection Log Information," and "Update Date and Time." It is noted that the management database may include one or more items other than the above items, or may not have some of the above items.

The item "Serial Number" represents a serial number given to each printer 14. Each record is identified by the serial number. Namely, the "Serial Number" is also information for identifying each of the records registered on the management database. A single record indicates a single printer 14. The serial number may be an example of "printer identification information" according to aspects of the present disclosure. Nonetheless, the "printer identification information" is not limited to the serial number, but may be any type of information (e.g., a Mac address and a unique printer name) as long as it is usable to identify each record (i.e., each printer) on the database.

The item "Model Name" indicates a model name of each printer 14. For each record, the model name is input into an entry input field associated with the item "Model Name." In an example shown in FIG. 3, a model name of "A001" is input for a record having "12345" as the "Serial Number" thereof.

The item "Internal Identification Information" is identification information assigned to each internal intermediary device 13. For instance, the internal identification information may be a GUID, a branch name, or a branch number assigned to each internal intermediary device 13 by the first program 69 of the management server 11 or a second program 29 of the external intermediary device 12. The first program 69 of the management server 11 or the second program 29 of the external intermediary device 12 may assign the internal identification information to each internal intermediary device 13 and may register the internal identification information onto the database, for instance, before the communication system 10 begins to be operated. The internal identification information indicates via which internal intermediary device 13 and which local network 16 the printer 14 identified by each record is connected. For instance, the printer 14 identified by the record having "12345" as the "Serial Number" is connected via the internal intermediary device 13 identified by the internal identification information "ABCD" and the associated local network 16.

The item "Branch Name" indicates a name of a branch where the printer 14 identified by each record is used. The item "Mac Address" indicates a Mac address assigned to each printer 14.

The item "Version Information" is information indicating a version of the control program 50 stored in each printer 14. In the example shown in FIG. 3, the control program 50 of "Ver. 1.31" is installed in the printer 14 identified by the serial number "12345."

The item "Print Settings" has a plurality of sub-items such as "Density" and "Sheet Type." The sub-item "Density" indicates a density of an image to be recorded on the label. For instance, the sub-item "Density" may be expressed with five degrees from "1" to "5." In this case, for instance, the density "5" may represent that the image is to be recorded on the label with a highest density. The sub-item "Sheet Type" indicates a type of a sheet set in the printer 14 identified by each record. For instance, the sheet type "A" indicates die cut paper. Further, the sheet type "B" indicates an indefinite-length label.

The item "Error Log Information" indicates a log of errors that have occurred in the printer 14. The item "Error Log Information" has one or more sub-items such as "cover open." The sub-item "cover open" represents, as an error log, a period of time during which an error state continued in which a cover of the printer 14 used for exchanging labels had been left open. As will be described later in detail, the control program 50 of each printer 14 is configured to, when executed, cause the CPU 41 to not perform a process of changing the version of the control program 50 in an error state such as a cover is opened.

The item "Connection Log Information" represents an online period during which the printer 14 identified by each record was being connected to the corresponding local network 16 and an offline period during which the identified printer 14 was not being connected to the corresponding local network 16. Hereinafter, a state in which an individual printer 14 is connected to the corresponding local network 16 may be referred to as an "online state." Further, a state in which the printer 14 is not connected to the local network 16 may be referred to as an "offline state."

The item "Update Date and Time" represents the last date and time when the information registered on the management database has been updated in a state where the printer 14 identified by each record was in the corresponding branch.

The data storage area 67 stores a third association table (not shown). The third association table shows an association between an instruction input from the administrator terminal 17 and a command corresponding to the instruction. On the third association table, the command corresponding to the instruction from the administrator is specified. Details will be described later.

The external intermediary device 12 includes a CPU 21, a memory 22, a communication I/F 23, and a communication bus 25. Configurations of the CPU 21, the memory 22, the communication I/F 23, and the communication bus 25 are substantially the same as the configurations of the CPU 41, the memory 42, the communication I/F 43, and the communication bus 46 of each printer 14. Hence, detailed explanations thereof will be omitted.

The memory 22 has a program storage area 26 and a data storage area 27. The program storage area 26 stores programs such as an OS 28 and the second program 29. Configurations of the program storage area 26 and the data storage area 27 are substantially the same as the configurations of the program storage area 47 and the data storage area 48 of each printer 14, and a configuration of the OS 28 is substantially the same as the OS 68 of the management server 11. Hence, detailed explanations thereof will be omitted.

The second program 29 is configured to, when executed by the CPU 21, cause the CPU 21 to receive an instruction transmitted by the management server 11 and transmit a command corresponding to the received instruction to a specified internal intermediary device 13. Further, the second program 29 is configured to, when executed, cause the CPU 21 to receive information and data transmitted by an internal intermediary device 13 and register the received information and data onto the management database stored in the data storage area 27. Further, the second program 29 is configured to, when executed, cause the CPU 21 to receive information and data transmitted by an internal intermediary device 13 and transmit the received information and data to the management server 11. The second program 29 may be a single program or an aggregate of a plurality of programs. Details of processing performed by the CPU 21 executing the second program 29 will be described later.

The data storage area 27 stores data necessary for executing the programs. Further, the data storage area 27 stores the aforementioned management database (see FIG. 3). It is noted that the management database stored in the data storage area 67 of the management server 11 and the management database stored in the data storage area 27 of the external intermediary device 12 may have the same configuration or may have different configurations. For instance, the management database allocated in the data storage area 67 of the management server 11 may not have the item "Internal Identification Information."

Further, the data storage area 27 stores a fourth association table (not shown). The fourth association table shows an association between an instruction command input from the management server 11 and a command transmitted to an internal intermediary device 13.

Each internal intermediary device 13 includes a CPU 31, a memory 32, a communication I/F 33, and a communication bus 35. Configurations of the CPU 31, the memory 32, the communication I/F 33, and the communication bus 35 are substantially the same as the configurations of the CPU 41, the memory 42, the communication I/F 43, and the communication bus 46 of each printer 14. Hence, detailed explanations thereof will be omitted.

The memory 32 has a program storage area 36 and a data storage area 37. The program storage area 36 stores programs such as an OS 38 and a third program 39. Configurations of the program storage area 36 and the data storage area 37 are substantially the same as the configurations of the program storage area 66 and the data storage area 67 of the management server 11. Further, a configuration of the OS 38 is substantially the same as the OS 68 of the management server 11. Hence, detailed explanations thereof will be omitted.

The third program 39 is configured to, when executed by the CPU 31, cause the CPU 31 to receive an instruction command transmitted by the external intermediary device 12 and transmit an instruction corresponding to the received instruction command to a specified printer 14. Further, the third program 39 is configured to, when executed, cause the CPU 31 to receive status information transmitted by a printer 14 and transmit the received status information to the external intermediary device 12. The third program 39 may be a single program or an aggregate of a plurality of programs. Details of processing performed by the CPU 31 executing the third program 39 will be described later.

The data storage area 37 stores data necessary for execution of the programs. Further, the data storage area 37 stores a first association table shown in FIG. 2B and a second association table shown in FIG. 2C. The first association table shows an association between the serial number and the model name of each printer 14. Each of the serial numbers registered on the first association table stored in an individual internal intermediary device 13 is a serial number assigned to a corresponding one of the printers 14 connected with the internal intermediary device 13 via the corresponding local network 16. In other words, the first association table shows the model names of the printers 14 communicable with the internal intermediary device 13 via the corresponding local network 16.

The second association table associates a model name of each printer 14 with commands Even the same instruction may provide different commands depending on the model name. Further, there may be an instruction that is unable to be input depending on the model name. The second association table is used for the third program 39 of the internal intermediary device 13 to generate a command to be transmitted to each corresponding printer 14 via the corresponding local network 16.

Hereinafter, referring to FIGS. 4 to 15B, explanations will be provided of processes to be performed by execution of the first program 69 of the management server 11, the second program 29 of the external intermediary device 12, the third program 39 of each internal intermediary device 13, and the control program 50 of each printer 14.

Figure 4:
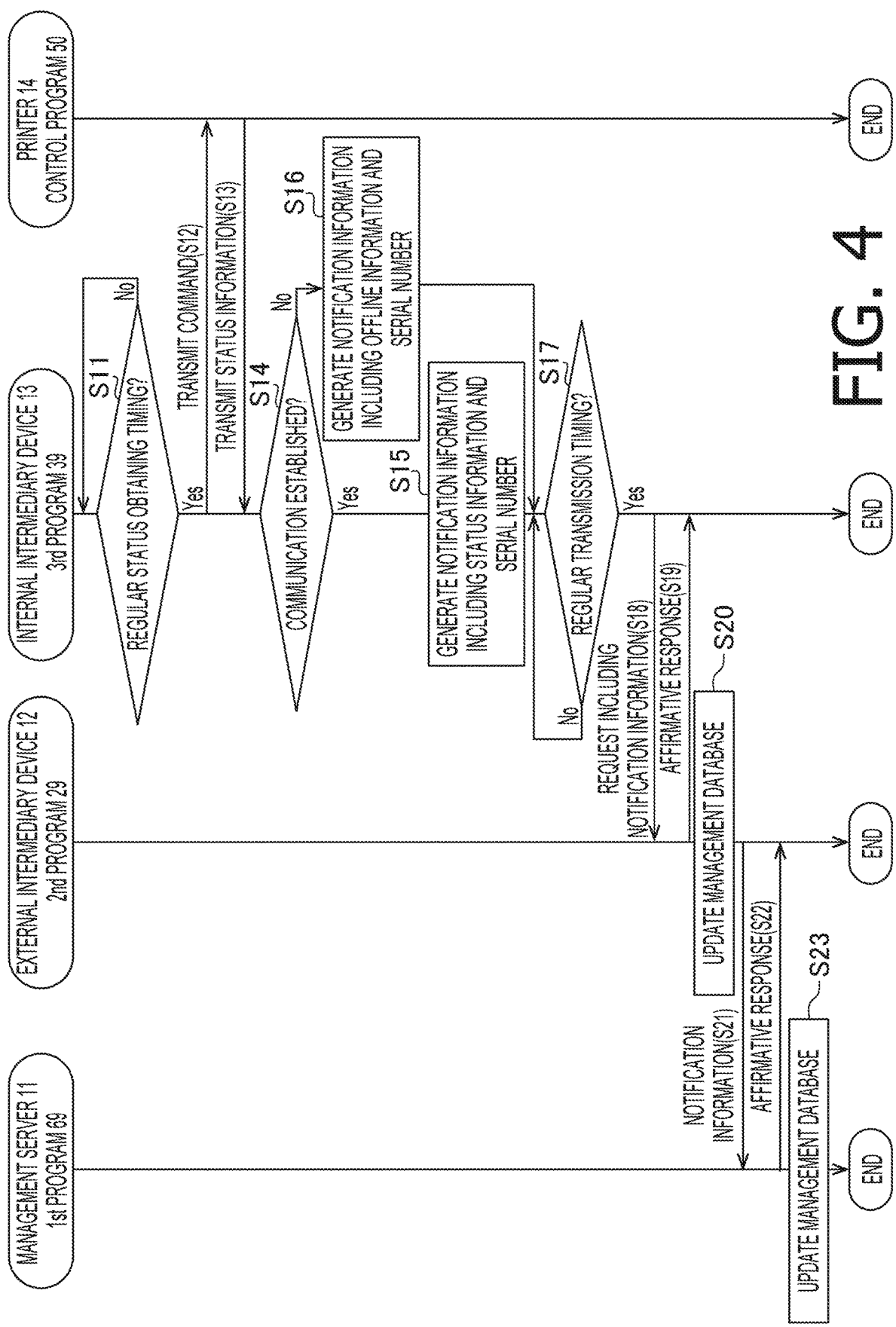
FIG. 4 shows a sequence of processes to be performed by the management server, an external intermediary device, each internal intermediary device, and each printer when status information of each printer is regularly obtained and registered onto the management database, in the illustrative embodiment according to one or more aspects of the present disclosure.

First, an explanation will be provided of a process of periodically registering the status information stored in the memory 42 of each printer 14 onto the management database stored in the memory 62 of the management server 11, with reference to FIG. 4.

The third program 39 of each internal intermediary device 13 (more exactly, the CPU 31 executing the third program 39) determines whether a regular status obtaining timing has come (S11). Specifically, the third program 39 determines whether an elapsed time since the last time the status information was obtained from each corresponding printer 14 has reached a first threshold period previously stored in the memory 32. The first threshold period is, for example, several tens of minutes to several hours. The third program 39 waits until it is determined that the regular status obtaining timing has come (S11: No). When determining that the regular status obtaining timing has come (S11: Yes), the third program 39 establishes communication with each printer 14 and transmits a command requesting transmission of the status information to each printer 14 via the communication I/F 33 and the local network 16 (S12).

The control program 50 of each printer 14 (more exactly, the CPU 41 executing the control program 50) receives the command from the corresponding internal intermediary device 13 via the communication I/F 43 (S12). The control program 50 transmits the status information stored in the memory 42 to the internal intermediary device 13 via the communication I/F 43 and the local network 16 in accordance with the received command (S13). The status information includes the aforementioned version information and print settings. When the cover is opened, the status information includes error information of "cover open."

The third program 39 of each internal intermediary device 13 attempts to receive the status information transmitted by each corresponding printer 14 via the communication I/F 33 (S13). The third program 39 determines whether the corresponding internal intermediary device 13 has established communication with each corresponding printer 14 and received the status information therefrom (S14). When determining that the internal intermediary device 13 has established communication with a printer 14 and received the status information therefrom (S14: Yes), the third program 39 generates notification information including the received status information and the serial number of the printer 14 that has transmitted the status information (S15). Meanwhile, when determining that the internal intermediary device 13 has not established communication with a printer 14 (S14: No), the third program 39 generates notification information including offline information representing that the printer 14 is in an offline state and the serial number of the printer 14 with which the internal intermediary device 13 has failed to establish communication (S16).

After generating the notification information (S15, S16), the third program 39 determines whether a regular transmission timing has come (S17). Specifically, the third program 39 determines whether an elapsed time since the last time the notification information was transmitted to the external intermediary device 12 has reached a second threshold period previously stored in the memory 32. The second threshold period is, for example, several minutes to several tens of minutes. When determining that the regular transmission timing has come (S17: Yes), the third program 39 transmits an HTTP request including the generated notification information to the external intermediary device 12 via the communication I/F 33 and the Internet 15 (S18).

The second program 29 of the external intermediary device 12 (more exactly, the CPU 21 executing the second program 29) receives the HTTP request including the notification information from each internal intermediary device 13 via the communication I/F 23 (S18). Then, the second program 29 transmits an HTTP response including an affirmative response representing that the notification information has been received, to each internal intermediary device 13 via the communication I/F 23 and the Internet 15 (S19). It is noted that each printer 14 is allowed to transmit the status information when connected with the corresponding local network 16. Hence, the status information is also online information representing that the corresponding printer 14 is in an online state. The second program 29 registers the status information (i.e., the online information) or the offline information included in the notification information received in S18 onto the management database, thereby updating the management database (S20). More specifically, the second program 29 specifies a record having the same serial number as included in the received notification information within the management database. Then, the second program 29 registers each piece of information such as the status information (i.e., the online information) or the offline information included in the notification information into the entry field for the corresponding item of the record specified within the management database.

Further, the second program 29 of the external intermediary apparatus 12 transmits the received notification information including the status information or the offline information to the management server 11 via the communication I/F 23 and the Internet 15 (S21).

The first program 69 of the management server 11 (more exactly, the CPU 61 executing the first program 69) receives the notification information from the external intermediary device 12 via the communication I/F 63 (S21). Then, the first program 69 transmits an affirmative response representing that the notification information has been received, to the external intermediary apparatus 12 via the communication I/F 63 and the Internet 15 (S22). Further, the first program 69 registers the status information (i.e., the online information) or the offline information included in the notification information received in S21 onto the management database, thereby updating the management database (S23). The process of step S21 in which the first program 69 receives the notification information including the status information is an example of the information receiving process.

Next, referring to FIGS. 5 to 14B, explanations will be provided of processes to be performed by execution of the first program 69 of the management server 11, the second program 29 of the external intermediary device 12, the third program 39 of each internal intermediary device 13, and the control program 50 of each printer 14, when the administrator changes the version of the control program 50 of each specified printer 14.

First, as shown in FIG. 5, the administrator operates a mouse and/or a keyboard of the administrator terminal 17 to activate a browser 19 (see FIG. 1) installed in the administrator terminal 17 (S31). The activated browser 19 receives an input from the administrator (S32). Specifically, the browser 19 receives an input of a URL published on the Internet 15 by the management server 11. The browser 19, which has received the input from the administrator, transmits an HTTP request including a request for management screen data to the management server 11 via the Internet 15 (S33).

In response to receiving the HTTP request including the request for the management screen data (S33), the first program 69 of the management server 11 transmits an HTTP response including the management screen data to the administrator terminal 17 via the communication I/F 63 and the Internet 15 (S34). It is noted that the management screen data is data of a web page.

The browser 19 of the administrator terminal 17 receives the management screen data (S34). Further, the browser 19 displays a management screen represented by the received management screen data on a display 20 (see FIG. 1) of the administrator terminal 17 (S35). Then, the browser 19 receives an input from the administrator (S36). The input of the administrator may include, but is not limited to, at least one of an input for designating first display screen data and an input of a user account. In response to receiving the input from the administrator, the browser 19 transmits an HTTP request including a request for the first display screen data to the management server 11 via the Internet 15 (S37).

In response to receiving the HTTP request including the request for the first display screen data (S37), the first program 69 of the management server 11 transmits an HTTP response including the first display screen data to the administrator terminal 17 via the communication I/F 63 and the Internet 15 (S38).

The browser 19 of the administrator terminal 17 receives the first display screen data (S38). Further, the browser 19 causes the display 20 to display a first display screen represented by the received first display screen data (S39). FIG. 11 shows an example of the first display screen. The first display screen includes a plurality of icons such as a "Management Information" icon 71, a "Firmware Update" icon 72, a "Firmware Synchronization" icon 73, a "Change Print Settings" icon 74, and a "Change Other Settings" icon.

The "Management Information" icon 71 is an icon for providing an instruction to browse the management database. The "Firmware Update" icon 72 is an icon for providing an instruction to change the version of the control program 50 of each printer 14. The "Firmware Synchronization" icon 73 is an icon for providing an instruction to maintain the control program 50 of each printer 14 to be of the same version. The "Change Print Settings" icon 74 is an icon for providing an instruction to change print settings such as "Density" described above. The "Change Other Settings" icon 75 is an icon for providing an instruction to change setting values other than the print settings.

As shown in FIG. 5, the browser 19 of the administrator terminal 17 receives an input of the administrator selecting an icon via the first display screen (S40). Hereinafter, a case where the administrator selects the "Firmware Update" icon 72 will be described. In response to the selection of the "Firmware Update" icon 72, the browser 19 transmits an HTTP request including a request for second display screen data to the management server 11 via the Internet 15 (S41).

The first program 69 of the management server 11 receives the HTTP request including the request for the second display screen data (S41). In response to receipt of the HTTP request, the first program 69 specifies the management database based on the aforementioned user account, and obtains the model names and the branch names registered on the specified management database. Thereby, the first program 69 generates the second display screen data that includes the obtained model names and the obtained branch names in below-mentioned pull-down menus 82 and 84, respectively (S42). Then, the first program 69 transmits an HTTP response including the generated second display screen data to the administrator terminal 17 via the I/F 63 and the Internet 15 (S43).

The browser 19 of the administrator terminal 17 receives the second display screen data (S43). Further, the browser 19 causes the display 20 to display a second display screen represented by the received second display screen data (S44). FIG. 11B shows an example of the second display screen represented by the second display screen data. The second display screen includes a text "Update of Firmware," a text "Filtering Setting," a first radio button 81, a text "Model Name," a pull-down menu 82, a second radio button 83, a text "Branch Name," a pull-down menu 84, a third radio button 85, a text "Others," a text box 86, a "Firmware Ver.," a text box 87, an "OK" icon 88, and a "Back" icon 89.

The pull-down menu 82 is a menu for designating a model name. When the pull-down menu 82 is operated, a list of the model names registered on the management database is displayed. The pull-down menu 84 is a menu for specifying a branch name. When the pull-down menu 84 is operated, a list of the branch names registered on the management database is displayed. The text box 86 is a text box in which other conditions are input. The text box 87 is a text box in which a version of the control program 50 as firmware is input. For instance, when the administrator wishes to change the version of the control program 50 of the printers 14 having the model name "A001," the administrator operates the first radio button 81 and selects the model name "A001" in the pull-down menu 82 by using the mouse and/or the keyboard. In addition, when the administrator wishes to change the version of the control program 50 of the printers 14 in the branch A, the administrator further selects the second radio button 83 and selects the branch name "branch A" in the pull-down menu 84. In another instance, when the administrator wishes to change the version of the control program 50 of the printers 14 having the internal identification information "ABCD," the administrator selects the third radio button 85 and inputs "ABCD" in the text box 86. Then, the administrator selects the "OK" icon 88. Hereinafter, an operation of the administrator selecting an icon by using the mouse and/or the keyboard may be referred to simply as "selecting."

As shown in FIG. 5, the browser 19 of the administrator terminal 17 receives, via the second display screen (see FIG. 11B), the designation of the model name using the pull-down menu 82, the input of the branch name using the pull-down menu 84, the input of the version information into the text box 87, the input of the internal identification information into the text box 86, and the selection of the "OK" icon 88 (S45). The browser 19 transmits an HTTP request including the received information (hereinafter, which may be referred to as "filtering information") to the management server 11 via the Internet 15 (S46).

The first program 69 of the management server 11 receives the HTTP request including the filtering information via the communication I/F 63 (S46).

The first program 69 generates third display screen data based on the filtering information included in the received HTTP request (S47). More specifically, for instance, when the filtering information includes the model name, the first program 69 specifies records having the same model name as included in the filtering information, on the management database. In another instance, when the filtering information includes the branch name, the first program 69 specifies records having the same branch name as included in the filtering information, on the management database. In yet another instance, when the filtering information includes the model name and the branch name, the first program 69 specifies records having the same model name and the same branch name as included in the filtering information, on the management database. Further, when the filtering information includes the internal identification information, the first program 69 specifies records having the same internal identification information as included in the filtering information, on the management database. Hereinafter, the records specified by the first program 69 in S47 may be referred to as the "specified records."

With respect to each of the specified records, the first program 69 reads out and obtains the information such as "Model Name," "Serial Number," and "Version Information" registered in each specified record. The first program 69 generates the third display screen data including the obtained information (S47). Further, the first program 69 transmits an HTTP response including the generated third display screen data to the administrator terminal 17 via the communication I/F 63 and the Internet 15 (S48).

When receiving the HTTP response including the third display screen data (S48), the browser 19 of the administrator terminal 17 causes the display 20 to display a third display screen represented by the third display screen data (S49). FIG. 12A shows an example of the third display screen. The third display screen includes a text "Model Name," and the model names of the specified records that are displayed under the text "Model Name." The third display screen further includes a text "Serial Number," and the serial numbers of the specified records that are displayed under the text "Serial Number." The third display screen further includes a text "Firmware Ver.," and the version information of the specified records that is displayed under the text "Firmware Ver." The third display screen further includes a text "Mac Address," and the Mac addresses of the specified records that are displayed under the text "Mac Address." The third display screen further includes an "Execute" icon 76, and a "Back" icon 77. The administrator selects the "Execute" icon 76 after checking the model names, the serial numbers, the version information, and the Mac addresses displayed on the display 20.

As shown in FIG. 5, when receiving the selection of the "Execute" icon 76 (S50), the browser 19 of the administrator terminal 17 transmits an HTTP request including an execution instruction to the management server 11 via the Internet 15 (S51).

When receiving the HTTP request including the execution instruction via the communication I/F 63 (S51), the first program 69 of the management server 11 generates fourth display screen data, as shown in FIG. 6 (S52). Then, the first program 69 transmits an HTTP response including the fourth display screen data to the administrator terminal 17 via the communication I/F 63 and the Internet 15 (S53).

When receiving the HTTP response including the fourth display screen data, the browser 19 of the administrator terminal 17 causes the display 20 to display a fourth display screen (not shown) represented by the fourth display screen data (S56). For instance, the fourth display screen includes a text "Currently Updating Firmware" and an "OK" icon. The browser 19 receives the selection of the "OK" icon via the fourth display screen (S57). Then, when receiving the selection of the "OK" icon, the browser 19 transmits an HTTP request including a request for a result of updating the version of the control program 50, to the management server 11 via the Internet 15 (S58).

Although the following features are not shown in the processes shown in FIGS. 5 to 7, when receiving the HTTP request including the request for the result of updating the version of the control program 50, the first program 69 of the management server 11 determines whether the update of the version of the control program 50 has been completed. When determining that the update of the version of the control program 50 has not been completed, the first program 69 again transmits the HTTP response including the fourth display screen data to the administrator terminal 17 via the communication I/F 63 and the Internet 15.

In response to receiving the HTTP request including the execution instruction (S51), the first program 69 of the management server 11 executes an execution process of updating the version of the control program 50 of each specified printer 14 (S54). The execution process will be described in detail with reference to FIGS. 8 and 9.

The first program 69 of the management server 11 generates a first instruction command, as shown in FIG. 8 (S91). More specifically, the first program 69 specifies a command corresponding to the instruction to "update the version of the firmware" on the aforementioned third association table, and incorporates, into the specified command, the serial numbers registered in the specified records and the download information, thereby generating the first instruction command. The download information is, for example, a URL from which a program file of the control program 50 of the version information "2.20" is downloadable. The download information is stored in the memory 62 of the management server 11. The first program 69 transmits the generated first instruction command to the external intermediary device 12 via the communication I/F 63 and the Internet 15 (S92).

Although the following features are not shown in the processes shown in FIGS. 8 and 9, the first program 69 of the management server 11 does not incorporate, into the first instruction command, the serial numbers of printers 14 which are registered in association with the version information "2.20" on the management database and have no need for updating of the version of the control program 50 thereof. In other words, the first program 69 adds, to the first instruction command, serial numbers that are not associated with the version information "2.20" among all the serial numbers registered in the specified records.

The second program 29 of the external intermediary device 12 receives the first instruction command via the communication I/F 23 (S92). In response to the receipt of the first instruction command, the second program 29 transmits an affirmative response representing that the first instruction command has been received, to the management server 11 via the communication I/F 23 and the Internet 15 (S93). In addition, the second program 29 identifies, on the management database (see FIG. 3), records having the same serial numbers as included in the received first instruction command (S94). Then, the second program 29 identifies the internal identification information registered in the identified record (S95). In other words, the second program 29 identifies the internal intermediary device 13 to which the command is to be sent. It is noted that if the first instruction command has internal identification information added thereto, the second program 29 obtains the internal identification information added to the first instruction command. The first program 69 of the management server 11 incorporates the internal identification information registered in the identified record into the first instruction command.

Next, the second program 29 of the external intermediary device 12 obtains a program file of the control program 50 with the version information "2.20," based on the download information added to the first instruction command (S96). Then, the second program 29 identifies a command corresponding to the received first instruction command on the aforementioned fourth association table, and generates a second instruction command by adding the serial numbers and the program file to the identified command (S97). Then, the second program 29 waits until the second program 29 receives an HTTP request sent by the internal intermediary device 13 to which the internal identification information identified in S95 has been given.

Each internal intermediary device 13 performs a polling process of periodically sending an HTTP request to the external intermediary device 12. Specifically, the third program 39 of the internal intermediary device 13 starts time measurement by a countdown timer after sending the last HTTP request to the external intermediary device 12, and determines whether the time measurement by the countdown timer has ended, that is, whether a transmission timing has come (S98). An initial value of the countdown timer is stored in the memory 32 in advance. For instance, the initial value is several minutes to several tens of minutes. The third program 39 waits until the transmission timing comes (S98: No). When determining that the transmission timing has come (S98: Yes), the third program 39 transmits an HTTP request including the internal identification information given to the third program 39 to the external intermediary device 12 via the communication I/F 33 and the Internet 15 (S99).

The second program 29 of the external intermediary device 12 receives the HTTP request from each internal intermediary device 13 via the communication I/F 23 (S99). Although the following features are not shown in the processes shown in FIGS. 8 and 9, the second program 29 determines whether the internal identification information included in each of the received HTTP requests is identical to the internal identification information identified in S95. In other words, the second program 29 determines whether each internal intermediary device 13 that has transmitted a corresponding one of the received HTTP requests is the internal intermediary 13 that is to transmit the second instruction command. When determining that the internal identification information included in one of the received HTTP requests is not identical to the internal identification information identified in S95, the second program 29 transmits an HTTP response that does not include the second instruction command to the corresponding internal intermediary device 13 via the communication I/F 23 and the Internet 15. Meanwhile, when determining that the internal identification information included in one of the received HTTP requests is identical to the internal identification information identified in S95, the second program 29 transmits an HTTP response including the second instruction command to the corresponding internal intermediary device 13 via the communication I/F 23 and the Internet 15 (S100).

The third program 39 of each internal intermediary device 13 receives the HTTP response from the external intermediary device 12 via the communication I/F 33 (S100). Then, the third program 39 determines whether the received HTTP response includes the second instruction command. When determining that the received HTTP response does not include the second instruction command, the third program 39 waits until a next transmission timing comes. Meanwhile, when determining that the received HTTP response includes the second instruction command, the third program 39 transmits an HTTP request including a notification representing that the second instruction command has been received, to the external intermediary device 12 via communication I/F 33 and the Internet 15.

In addition, the third program 39 of each internal intermediary device 13 identifies, on the first association table, model names associated with the serial numbers added to the received second instruction command. Subsequently, the third program 39 identifies, on the second association table, commands associated with an instruction indicated by the second instruction command and the identified model names. Then, the third program 39 generates a third instruction command by adding the program file added to the second instruction command to the identified commands (S101). The third instruction command is a command that instructs the printer 14 to incorporate the control program 50 indicated by the added program file.

The third program 39 of each internal intermediary device 13 attempts to establish communication with printers 14 corresponding to the serial numbers included in the second instruction command (S102). Then, the third program 39 determines whether the communication has been established (S103). When determining that the communication has not be established (S103: No), the third program 39 transmits an HTTP request including the offline information and the serial numbers of printers 14 with which the communication has not been established, to the external intermediary device 12 via the communication I/F 33 and the Internet 15 (S104). Meanwhile, when determining that the communication has been established with printers 14 (S103: Yes), the third program 39 transmits the third instruction command to the printers 14 via the communication I/F 33 and the local network 16 (S105).

The control program 50, of each printer 14 with which the communication has been established, receives the third instruction command via the communication I/F 43 (S105). Then, as shown in FIG. 9, the control program 50 stores a program file included in the received third instruction command, and is updated to the stored program file (S106). The control program 50 determines whether the control program 50 has been updated (S107). For instance, when the program file is corrupted and inappropriate, the control program 50 determines that the control program 50 has not been updated (S107: No). Further, for instance, when the cover is open, and therefore the control program 50 has refrained from being updated, the control program 50 determines that the control program 50 has not been updated (S107: No).

When determining that the control program 50 has not been updated (S107: No), the control program 50 transmits a non-update notification including error information indicating a cause why the control program 50 has failed to be updated, to the corresponding internal intermediary device 13 via the communication I/F 43 and the local network 16 (S108). Examples of the error information may include, but are not limited to, "Cover Open" representing that the cover is open and "Inappropriate" representing that the program file is not appropriate.

When determining that the control program 50 has been updated (S107: Yes), the control program 50 transmits an update notification representing that the control program 50 has been updated, to the corresponding internal intermediary device 13 via the communication I/F 43 and the local network 16 (S109).

In response to receiving the non-update notification (S108), the third program 39 of each corresponding internal intermediary device 13 generates an HTTP request including the non-update notification and the serial numbers of printers 14 that have transmitted the non-update notification (S110). Then, the third program 39 transmits the generated HTTP request to the external intermediary device 12 via the communication I/F 33 and the Internet 15 (S111). Meanwhile, in response to receiving the update notification (S109), the third program 39 transmits a command requesting transmission of the status information to printers 14 that have transmitted the update notification, via the communication I/F 33 and the local network 16 (S112).

The control program 50 of each printer 14 that has transmitted the update notification receives the command from the corresponding internal intermediary device 13 via the communication I/F 43 (S112). According to the received command, the control program 50 transmits the status information stored in the memory 42 to the internal intermediary device 13 via the communication I/F 43 and the local network 16 (S113).

The third program 39 of each internal intermediary device 13 receives the status information from relevant printers 14 via the communication I/F 33 (S113). The third program 39 generates an HTTP request including the received status information and the serial number of each relevant printer 14 that has sent the status information (S114). The third program 39 transmits the generated HTTP request to the external intermediary device 12 via the communication I/F 33 and the Internet 15 (S115).

The second program 29 of the external intermediary device 12 receives the HTTP request including the status information from each internal intermediary device 13 via the communication I/F 23 (S115). Then, the second program 29 transmits the HTTP response including an affirmative response representing that status information has been received, to each internal intermediary device 13 via the communication I/F 23 and the Internet 15 (S116).

The second program 29 of the external intermediary device 12 registers the offline information received in S104, the non-update notification received in step S111, or the status information included in the HTTP request received in S115 onto the management database, thereby updating the management database (S117). The second program 29 transmits the offline information, the non-update notification, or the status information to the management server 11 via the communication I/F 23 and the Internet 15 (S118).

The first program 69 of the management server 11 receives the offline information, the non-update notification, or the status information from the external intermediary device 12 via the communication I/F 63 (S118). The first program 69 transmits an affirmative response representing that one of the offline information, the non-update notification, and the status information has been received, to the external intermediary device 12 via the communication I/F 63 and the Internet 15 (S119). The first program 69 registers the offline information, the non-update notification, or the status information included in the received HTTP request onto the management database, thereby updating the management database (S120). Thereafter, the execution process of S54 (see FIG. 6) is terminated.

As shown in FIG. 6, after the completion of the execution process of S54, the first program 69 of the management server 11 generates fifth display screen data showing results of the update of the control program 50 (S55). The fifth display screen data is data representing a fifth display screen as shown in FIG. 12B. The fifth display screen has a text "The Results of The Firmware Update", a "Display Non-Updated Only" icon 91, texts of "Model Name," "Serial Number," "Firmware Ver.," "Update," and "Cause," a plurality of record frame icons 92, and an "End" icon 93.

As shown in FIG. 12B, each record frame icon 92, which indicates an individual record, has a text such as "A001" representing the model name, a text such as "23456" or "34567" representing the serial number, a text such as "1.21" or "2.20" representing the version information, a text such as "Not Yet," "Done" or "–" representing the update result, and a text such as "Offline" or "Cover Open" representing the cause of unsuccessful update. In a specific example shown in FIG. 12B, the record frame icon 92 which is surrounded by a dashed line and has the serial number "23456" is associated with "A001" representing the model name, "1.21" representing the firmware version, "Not Yet" representing that the control program 50 has not been updated, and "Offline" representing the cause why the control program 50 has failed to be updated.

A detailed explanation will be provided of a process to generate a fifth display screen data representing a fifth display screen by the CPU 62 of the management server 11 executing the first program 69. The first program 69 (more exactly, the CPU 62 executing the first program 69) identifies records having the same serial number as included in the first instruction command on the management database stored in the data storage area 67. Then, the first program 69 associates one or more records of which the version information is not "2.20," among the identified records, with the update result "Not Yet." In addition, the first program 69 associates one or more records of which the version information is "2.20," among the identified records, with the update result "Done." Then, the first program 69 obtains information registered for one or more predetermined specific items among the items of the identified records. Further, the first program 69 generates the fifth display screen data based on the obtained information registered for the one or more specific items and the aforementioned update results. The one or more specific items may include, but are not limited to, "Model Name," "Serial Number," "Version Information," error information such as the aforementioned "Cover Open" included in the non-update notification, and the off-line information.

As shown in FIG. 6, after generating the fifth display screen data, the first program 69 of the management server 11 waits until the first program 69 receives the HTTP request including the request for the result of updating the version of the control program 50 (S58). In other words, the first program 69 waits until the administrator selects the "OK" icon on the fourth display screen. In response to receiving the HTTP request including the request for the result of updating the version of the control program 50 (S58), the first program 69 transmits an HTTP response including the fifth display screen data to the administrator terminal 17 via the communication I/F 63 and the Internet 15 (S59).

In response to receiving the HTTP response including the fifth display screen data (S59), the browser 19 of the administrator terminal 17 causes the display 20 to display the fifth display screen (see FIG. 12B) represented by the received fifth display screen data (S60). Then, the browser 19 receives a selection by the administrator from among the icons such as the "Display Non-Updated Only" icon 91, the record frame icons 92, and the "End" icon 93 (S61). When receiving a selection of the "Display Non-Updated Only" icon 91, the browser 19 transmits an HTTP request including a display switching instruction to the management server 11 via the Internet 15 (S62).

In response to receiving an HTTP request including the display switching instruction (S62), the first program 69 of the management server 11 generates sixth display screen data including the one or more specific items of one or more records associated with the update result "Not Yet" among the aforementioned specified records (S63). Then, the first program 69 transmits an HTTP response including the generated sixth display screen data to the administrator terminal 17 via the communication I/F 63 and the Internet 15 (S64).

In response to receiving the HTTP response including the sixth display screen data (S64), the browser 19 of the administrator terminal 17 causes the display 20 to display a sixth display screen represented by the received sixth display screen data (S65). FIG. 13A shows an example of the sixth display screen. The sixth display screen has only record frame icons 92 associated with the update result "Not Yet" among the aforementioned record frame icons 92. In addition, the sixth display screen has a "Display All" icon 94, instead of the "Display Non-Updated Only" icon 91 on the fifth display screen (see FIG. 12B). Further, the sixth display screen has the "End" icon 93 in the same manner as the fifth display screen.

Although the following features are not shown in FIG. 6, when the "Display All" icon 94 is selected on the sixth display screen, the browser 19 performs the same process as a process of the aforementioned steps S62 to S64, and causes the display 20 to display the fifth display screen again.

In response to a record frame icon 92 being selected on the fifth display screen or the sixth display screen (S66), the browser 19 of the administrator terminal 17 transmits an HTTP request including a specified serial number, which is a serial number displayed on the selected record frame icon 92, and cause information to the management server 11 via the Internet 15 (S67). Examples of the cause information may include, but are not limited to, "Online" or "Cover Open" included in the fifth display screen data or the sixth display screen data.

The first program 69 of the management server 11 receives the HTTP request including the specified serial number via the communication I/F 63 (S67).

The first program 69 identifies, on the management database, a record having the same serial number as the specified serial number included in the received HTTP request (S68). In addition, the first program 69 identifies log information corresponding to the cause information included in the received HTTP request (S69). Specifically, when the cause information is "Offline," the first program 69 identifies the item "Connection Log Information" on the management database as the log information to be obtained. Further, when the cause information is "Cover Open," the first program 69 identifies the sub-item "cover open" of the item "Error Log Information" on the management database as the log information to be obtained. The first program 69 generates seventh display screen data, based on the log information identified in S69 among the log information (e.g., the connection log information and the error log information) of the record identified in S68 (S70). Then, the first program 69 transmits an HTTP response including the generated seventh display screen data to the administrator terminal 17 via the communication I/F 63 and the Internet 15 (S71). The following provides an explanation of an example in which the first program 69 identifies one or more records having the serial number "23456" in S68 and identifies the item "Connection Log Information" in S69.

In response to receiving the HTTP response including the seventh display screen data (S71), the browser 19 of the administrator terminal 17 causes the display 20 to display a seventh display screen represented by the seventh display screen data (S72). FIG. 13B shows an example of the seventh display screen. The seventh display screen includes texts such as "Model Name: A001," "Serial Number: 23456," and "Online Information." The seventh display screen further includes the connection log information of one week that represents periods of time during which the online state was maintained and periods of time during which the offline state was maintained. The seventh display screen further includes a "Back" icon 78 and an "Update Timing Setting" icon 79. The connection log information includes a text "Mon" representing Monday, connection log information for Monday, a text "Tue" representing Tuesday, connection log information for Tuesday, a text "Wed" representing Wednesday, connection log information for Wednesday, a text "Thu" representing Thursday, connection log information for Thursday, a text "Fri" representing Friday, connection log information for Friday, a text "Sat" representing Saturday, connection log information for Saturday, a text "Sun" representing Sunday, and connection log information for Sunday. The connection log information for each day of the week includes texts such as "9," "12," "15," and "18" to indicate times of each day, respectively. Further, the connection log information includes one or more filled rectangular bars 101 each indicating a period of time during which the online state was maintained. In the example shown in FIG. 13B, the bars 101 indicate that the online state is maintained for a period of time from 9 a.m. to 12 p.m. on Monday and a period of time from 9 a.m. to 12 p.m. on Thursday.

The connection log information displayed on the seventh display screen makes the administrator aware that the printer 14 to which the serial number "23456" is assigned is online during the period of time from 9 a.m. to 12 p.m. on Monday and the period of time from 9 a.m. to 12 p.m. on Thursday, and that the control program 50 is highly likely to be properly updated if the update is implemented during one of the said periods of time. The administrator who has seen the seventh display screen selects the "Update Timing Setting" icon 79 in order to provide an instruction to update the control program 50 during one of the aforementioned periods of time.

When receiving the selection of the "Update Timing Setting" icon 79 (S73), as shown in FIG. 7, the browser 19 of the administrator terminal 17 transmits an HTTP request including a request for the eighth display screen data and the aforementioned specified serial number to the management server 11 via the Internet 15 (S74).

The first program 69 of the management server 11 receives the request for the eighth display screen data and the HTTP request including the specified serial number via the communication I/F 63 (S74). Then, the first program 69 generates the eighth display screen data including the specified serial number and the model name of the printer 14 identified by the specified serial number (S75). Further, the first program 69 transmits an HTTP response including the generated eighth display screen data to the administrator terminal 17 via the communication I/F 63 and the Internet 15 (S76).

In response to receiving the HTTP response including the eighth display screen data (S76), the browser 19 of the administrator terminal 17 causes the display 20 to display an eighth display screen represented by the eighth screen display data (S765). FIG. 14A shows an example of the eighth display screen. The eighth display screen includes texts such as "Update Timing Setting," "Model Name: A001," and "Serial Number: 23456." The eighth display screen further includes a text "Update Date," a context menu 102 for receiving an input of an update date, a text "Update Time," pull-down menus 103 and 104 for receiving an input of an update time, and an "OK" icon 105. The administrator who has seen the eighth display screen specifies "2019.05.20" on the context menu 102, and specifies "9:30" on the pull-down menus 103 and 104. Then, the administrator selects the "OK" icon 105.

As shown in FIG. 7, when receiving the inputs of the update date "2019.05.20" and the update time "9:30" and the selection of the "OK" icon 105 (S77), the browser 19 of the administrator terminal 17 transmits an HTTP request including the update date, the update time, and the aforementioned specified serial number to the management server 11 via the Internet 15 (S78).

In response to receiving the HTTP request including the update date, the update time, and the specified serial number via the I/F 63 (S78), the first program 69 of the management server 11 transmits an HTTP response including reception confirmation screen data via the communication I/F 63 and the Internet 15 (S79).

In response to receiving the HTTP response including the reception confirmation screen data (S79), the browser 19 of the administrator terminal 17 causes the display 20 to display a reception confirmation screen represented by the reception confirmation screen data (S80).

Meanwhile, in response to receiving the HTTP request including the update date, the update time, and the specified serial number (S78), the first program 69 of the management server 11 identifies a record having the same serial number as the specified serial number on the management database, and inputs the received update date and the received update time into an entry field for the item "update schedule" (not shown) of the identified record (S81). Then, the first program 69 waits until the update date and time registered on the management database is reached (S82: No). When determining that the update date and time registered on the management database has been reached (S82: Yes), the first program 69 performs substantially the same execution process as in the aforementioned step S54 (S83). Then, the first program 69 waits until the first program 69 receives an HTTP request including a request for update results from the administrator terminal 17.

On the other hand, after the set update date and time has passed, the administrator activates the browser 19 of the administrator terminal 17 to make a request for the update results and input the aforementioned user account (S84). In response to receiving the request for the update results and the input of the user account (S84), the browser 19 transmits an HTTP request including the request for the update results and the user account to the management server 11 via the Internet 15 (S85).

In response to receiving the HTTP request including the request for the update results via the communication I/F 63 and the Internet 15 (S85), the first program 69 of the management server 11 generates update result screen data in substantially the same manner as in the aforementioned step S55 where the fifth display screen data is generated (S86). Then, the first program 69 transmits an HTTP response including the generated update result screen data to the administrator terminal 17 via the communication I/F 63 and the Internet 15 (S87).

In response to receiving the HTTP response including the update result screen data (S87), the browser 19 of the administrator terminal 17 causes the display 20 to display an update result screen represented by the update result screen data (S88).

Subsequently, an explanation will be provided of a synchronization process in which the control programs 50 of the plurality of printers 14 are maintained to be of the same version by the CPU 61 of the management server 11 executing the first program 69, with reference to FIGS. 10, 14B, and 15A.

As shown in FIG. 10, the browser 19 of the administrator terminal 17 performs a process of the aforementioned steps S31 to S39, thereby displaying the first display screen (see FIG. 11A) on the display 20. The browser 19 receives a selection of a "Firmware Synchronization" icon 73 on the first display screen (S121). In response to receiving the selection of the "Firmware Synchronization" icon 73, the browser 19 transmits an HTTP request including a request for a synchronization instruction to perform firmware synchronization to the management server 11 via the Internet 15 (S122).

The first program 69 of the management server 11 receives the HTTP request including the request for the synchronization instruction via the communication I/F 63 (S122). Then, the first program 69 generates ninth display screen data in substantially the same manner as the generation of the aforementioned second display screen data, and transmits an HTTP response including the generated ninth display screen data via the communication I/F 63 and the Internet 15 (S123). As shown in FIG. 14B, a ninth display screen represented by the ninth display screen data includes a text "Firmware Synchronization" instead of "Firmware Update" on the second display screen.

As shown in FIG. 10, in response to receiving the HTTP response including the ninth display screen data (S123), the browser 19 of the administrator terminal 17 causes the display 20 to display the ninth display screen represented by the ninth display screen data (S124). Then, in substantially the same manner as on the aforementioned second display screen, the browser 19 receives inputs of filtering information and a selection of the "OK" icon 88 on the ninth display screen (S125). The browser 19 transmits an HTTP request including the received filtering information to the management server 11 via the Internet 15 (S126).

The first program 69 of the management server 11 receives the HTTP request including the filtering information via the communication I/F 63 and the Internet 15 (S126). Then, based on the received filtering information, the first program 69 generates the third display screen data in substantially the same manner as in the aforementioned step S 47 (S127), and transmits an HTTP response including the generated third display screen data to the administrator terminal 17 via the communication I/F 63 and the Internet 15 (S128).

In response to receiving the HTTP response including the third display screen data (S128), the browser 19 of the administrator terminal 17 causes the display 20 to display the third display screen represented by the third display screen data (S1285). Then, the browser 19 receives a selection of the "Execute" icon 76 on the third display screen (S129). In response to receiving the selection of the "Execute" icon 76, the browser 19 transmits an HTTP request including an instruction to perform firmware synchronization to the management server 11 via the Internet 15 (S130).

The first program 69 of the management server 11 receives the HTTP request including the instruction to perform firmware synchronization and the aforementioned specified serial number via the communication I/F 63 and the Internet 15 (S130).

In response to receiving the HTTP request including the instruction to perform firmware synchronization, the first program 69 identifies a record having the same serial number as the specified serial number on the management database. Then, in the identified record, the administrator inputs the version information "2.20" specified by the administrator in an entry field for an item "Synchronization" (not shown) (S131). Then, in response to receiving the status information from the external intermediary device 12 (see FIG. 4, S21), the first program 69 determines whether the management database has been updated (S132). When determining that the management database has been updated (S132: Yes), the first program 69 determines whether the version information is registered for the item "Synchronization" of the updated record. Then, when determining that the version information is registered for the item "Synchronization" of the updated record, the first program 69 determines whether the version information registered for the item "Synchronization" is identical to the version information registered for the item "Version Information" (S133).

It is noted that the first program 69 of the management server 11 may determine whether the version information registered for the item "Synchronization" is identical to the version information registered for the item "Version Information" regularly, for instance, at a fixed time each day, rather than when the management database has been updated after the receipt of the status information.

When determining that the version information registered for the item "Synchronization" is identical to the version information registered for the item "Version Information" (S133: Yes), the first program 69 of the management server 11 skips the execution process of S134. Meanwhile, when determining that the version information registered for the item "Synchronization" is not identical to the version information registered for the item "Version Information" (S133: No), the first program 69 performs the execution process that is the same process as performed in S54 (S134). It is noted that in the execution process performed in S134, the first program 69 adds, to the first instruction command generated in S91, the serial number of a record in which the version information registered for the item "Synchronization" is not identical to the version information registered for the item "Version Information." When the execution process in S134 is performed, the control program 50 of a version different from the version information specified by the administrator is updated.

On the other hand, in order to check a status of synchronization, the administrator activates the browser 19 of the administrator terminal 17 and inputs a checking instruction to check the status of synchronization. When receiving the input of the checking instruction (S135), the browser 19 transmits an HTTP request including the checking instruction to the management server 11 via the Internet 15 (S136).

When receiving the HTTP request including the checking instruction via the communication I/F 63 and the Internet 15 (S136), the first program 69 of the management server 11 identifies, on the management database, records in which version information is registered for the item "Synchronization." Then, with respect to each of the identified records, the first program 69 determines whether the version information registered for the item "Synchronization" is identical to the version information registered for the item "Version Information." The first program 69 associates, with synchronization information "OK," a record in which the version information registered for the item "Synchronization" is identical to the version information registered for the item "Version Information." On the other hand, the first program 69 associates, with synchronization information "NG," a record in which the version information registered for the item "Synchronization" is not identical to the version information registered for the item "Version Information." Then, the first program 69 generates tenth display screen data including the model name, the serial number, the version information, the update date and time, and the associated synchronization information of each identified record (S137).

FIG. 15A shows an example of a tenth display screen represented by the tenth display screen data. The tenth display screen includes a text "Synchronization Checking", and a "Display Unsynchronized Only" icon 106 for switching the display. The tenth display screen further includes texts such as "Model Name," "Serial Number," "Firmware Ver.," "Synchronization," and "Checking Date and Time," and an "OK" icon 107.

Under the text "Model Name," the model name of each identified record is displayed. Under the text "Serial Number," the serial number of each identified record is displayed. Under the text "Firmware Ver.," the version information of each identified record is displayed. Under the text "Synchronization," the synchronization information "OK" or "NG" of each identified record is displayed. Under the text "Checking Date and Time," the update date and time of each identified record is displayed.

The "Display Unsynchronized Only" icon 106 is an icon for receiving an administrator's instruction to cause the display 20 to display only records having the serial numbers associated with the synchronization information "NG." When the "Display Unsynchronized Only" icon 106 is selected by the administrator, the browser 19 and the first program 69 perform substantially the same processes as when the "Display Non-Updated Only" icon 91 is selected. Consequently, only the records having the serial numbers associated with the synchronization information "NG" are displayed on the display 20.

When receiving a selection of the "OK" icon 107, the browser 19 of the administrator terminal 17 performs, for instance, substantially the same process as in the steps S33 to S35, thereby causing the display 20 to display the management screen. Then, the browser 19 terminates the process.

Advantageous Effects of Illustrative Embodiment

Before the execution process to update the control program 50 of each specified printer 14 is performed, the first program 69 causes the display 20 of the administrator terminal 17 to display the serial number of each specified printer 14 of which the control program 50 is to be updated (see the third display screen shown in FIG. 12A). After the execution process to update the control program 50 of each specified printer 14 is performed, the first program 69 causes the display 20 to display the serial number and the update result such as "Not Yet" or "Done" of each specified printer 14 (see the fifth display screen shown in FIG. 12B). Thus, the first program 69 enables the administrator to easily recognize whether the control program 50 of each printer 14 specified by the administrator has been updated.

Moreover, the first program 69 may cause the display 20 of the administrator terminal 17 to display only the serial numbers of the printers 14 of which the control programs 50 have not been updated (see the sixth display screen shown in FIG. 13A). Thus, the first program 69 enables the administrator to recognize only the printers 14 of which the control programs 50 have not been updated.

In addition, the first program 69 causes the display 20 of the administrator terminal 17 to display the cause information such as "Offline" or "Cover Open" on the fifth display screen (see FIG. 12B) and the sixth display screen (see FIG. 13A). Therefore, the first program 69 enables the administrator to recognize the causes why the control programs 50 have not been updated.

When the administrator selects a record frame icon 92 on the fifth display screen or the sixth display screen, the first program 69 causes the display 20 of the administrator terminal 17 to display the log information corresponding to the cause why the associated control program 50 has failed to be updated. In other words, the first program 69 enables the administrator to select whether to show on the display 20 the log information corresponding to the cause why the associated control program 50 has failed to be updated. Further, the first program 69 enables the administrator to recognize the log information corresponding to the cause why the associated control program 50 has failed to be updated. As a result, the first program 69 enables reduction of burdens placed on the administrator who browses the management database and checks the log information corresponding to the cause why the associated control program 50 has failed to be updated.

In addition, the first program 69 causes the display 20 to display the "update timing setting" icon 79 for setting a date and time to update the control program 50 of the specified printer 14, as well as the log information corresponding to the cause why the control program 50 has failed to be updated, on the seventh display screen (see FIG. 13B). Accordingly, the first program 69 enables the administrator to specify a date and time when the control program 50 is highly likely to be properly updated, thereby updating the control program 50 on the specified date and time.

In addition, the first program 69 displays the eighth display screen on the display 20 of the administrator terminal 17 to receive the schedule for reattempting to update the control program 50 of the specified printer that has failed to be updated. Therefore, the first program 69 enables reduction of burdens placed on the administrator who selects the "Firmware Update" icon 72 on the first display screen, inputs the model name or the serial number on the second display screen, and selects the "OK" icon 88 and the "Execution" icon 76.

In addition, the first program 69 performs the synchronization process shown in FIG. 10. Accordingly, the first program 69 may maintain the version of the control program 50 of the printer 14 specified by the administrator to be of the same version specified by the administrator.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications according to aspects of the present disclosure are feasible.

First Modification

In the aforementioned illustrative embodiment, an example has been described in which the first program 69 of the management server 11 (more exactly, the CPU 61 executing the first program 69) transmits various types of display screen data (e.g., the first display screen data) to the administrator terminal 17 and receives an instruction to update the version of the control program 50 and an instruction to change setting values (e.g., a setting value for the print setting). However, the management database is also stored in the memory 22 of the external intermediary device 12, and the external intermediary device 12 is a web server that publishes its URL on the Internet 15. That is, the second program 29 of the external intermediary device 12 (more exactly, the CPU 21 executing the second program 29) may also perform substantially the same processes as by the first program 69. The second program 29 of the external intermediary device 12 may perform the processes shown in FIGS. 5 to 7 in place of the first program 69.

Even if the second program 29 performs substantially the same processes as shown in FIGS. 5 to 7, it is possible to achieve substantially the same operations and advantageous effects as described in the aforementioned illustrative embodiment.

In addition, in the first modification and the below-mentioned second to fifth modifications, other configurations than configurations described or to be described in each modification may be the same as exemplified in the aforementioned illustrative embodiment.

Second Modification

In the aforementioned illustrative embodiment, an example has been described in which the first program 69 of the management server 11 (more exactly, the CPU 61 executing the first program 69) transmits various types of display screen data (e.g., the first display screen data) to the administrator terminal 17 and receives an instruction to update the version of the control program 50 and an instruction to change setting values (e.g., a setting value for the print setting). However, the third program 39 of each internal intermediary device 13 (more exactly, the CPU 31 executing the third program 39) may perform substantially the same processes as shown in FIGS. 5 to 7 in place of the first program 69.

More specifically, the memory 32 of each internal intermediary device 13 may store the management database as shown in FIG. 3. Nonetheless, it is noted that the management database stored in the memory 32 of each internal intermediary device 13 may include only records of printers 14 connected with each internal intermediary device 13 via the corresponding local network 16. In response to receiving the status information from each connected printer 14 (S13), the third program 39 of each internal intermediary device 13 may register the received status information onto the management database stored in memory 32.

Further, each internal intermediary device 13 may be connected with the administrator terminal 17 via the corresponding local network 16. That is, each individual internal intermediary device 13 and the administrator terminal 17 may communicate with each other via the corresponding local network 16.

The third program 39 of each internal intermediary device 13 and the administrator terminal 17 may communicate with each other via the corresponding local network, thereby performing substantially the same processes as shown in FIGS. 5 to 7.

In the second modification as well, it is possible to achieve substantially the same operations and advantageous effects as described in the aforementioned illustrative embodiment.

In the second modification, the administrator terminal 17 and the internal intermediate devices 13 may be the same terminal device.

Third Modification

In the aforementioned illustrative embodiment, an example has been described in which the management database is stored in the memory 62 of the management server 11, and the first program 69 of the management server 11 (more exactly, the CPU 61 executing the first program 69) generates various types of display screen data such as the first display screen data and the second display screen data by using the management database. However, the first program 69 may transmit an instruction to generate display screen data to the external intermediary device 12 storing the management database. The second program 29 of the external intermediary device 12 may generate the display screen data according to the instruction and transmit the generated display screen data to the management server 11.

Fourth Modification

In a fourth modification, as shown in FIG. 16, an example will be presented in which a process of S141 to S148 is performed between the steps S58 and S61. Specifically, an example will be described in which an eleventh display screen (see FIG. 15B) is displayed on the display 20 of the administrator terminal 17 before the fifth display screen is displayed on the display 20.

As shown in FIG. 16, in response to receiving the HTTP request including the request for the update result via the communication I/F 63 and the Internet 15 (S58), the first program 69 of the management server 11 generates the eleventh display screen data (S141). Specifically, the first program 69 calculates a first value and a second value. The first value is the number of specified records associated with the update result "Done" among the aforementioned specified records. The second value is the number of specified records associated with the update result "Not Yet" among the aforementioned specified records. Then, the first program 69 generates the eleventh display screen data including the calculated first value and the calculated second value. The eleventh display screen data represents an eleventh display screen shown in FIG. 15B.

The eleventh display screen data includes a semicircle first icon 111 and a semicircle second icon 112. The first icon 111 and the second icon 112 form substantially a circular object. The first icon 111 has a text "Updated" and a text "12" representing the first value. The second icon 112 has a text "Not Updated" and a text "5" representing the second value. The first icon 111 makes the administrator recognize that the number of printers 14 of which the control programs 50 have been updated is 12. The second icon 112 makes the administrator recognize that the number of printers 14 of which the control programs 50 have not been updated is 5.

As shown in FIG. 16, the first program 69 of the management server 11 transmits an HTTP response including the generated eleventh display screen data to the administrator terminal 17 via the communication I/F 63 and the Internet 15 (S142).

In response to receiving the HTTP response including the eleventh display screen data (S142), the browser 19 of the administrator terminal 17 causes the display 20 to display the eleventh display screen represented by the received eleventh display screen data (S143). Then, the browser 19 receives a selection of the first icon 111 or the second icon 112 (S144). The browser 19 transmits an HTTP request including first selection information or second selection information to the management server 11 via the Internet 15 (S145). The first selection information represents that the first icon has been selected. The second selection information represents that the second icon 112 has been selected.

The first program 69 of the management server 11 receives the HTTP request including the first selection information or the second selection information via the communication I/F 63 and the Internet 15 (S145). When the received HTTP request includes the first selection information, the first program 69 generates twelfth display screen data representing a twelfth display screen (not shown) (S146). When the received HTTP request includes the second selection information, the first program 69 generates the fifth display screen data representing the aforementioned fifth display screen (S146). Then, the first program 69 transmits an HTTP response including the generated twelfth display screen data or an HTTP response including the generated fifth display screen data to the administrator terminal 17 via the communication I/F 63 and the Internet15 (S147). The twelfth display screen includes the serial numbers and the model names of records associated with the update result "Done." The fifth display screen (see FIG. 12B) includes the serial numbers and the model names of records associated with the update result "Not Yet."

In response to receiving the HTTP response including the twelfth display screen data (S147), the browser 19 of the administrator terminal 17 causes the display 20 to display the twelfth display screen represented by the twelfth display screen data (S148). In response to receiving the HTTP response including the fifth display screen data (S147), the browser 19 of the administrator terminal 17 causes the display 20 to display the fifth display screen represented by the fifth display screen data (S148). Then, the browser 19 of the administrator terminal 17 and the first program 69 of the management server 11 perform S61 and the following steps in substantially the same manner as in the aforementioned illustrative embodiment.

In the fourth modification, the first program 69 enables the administrator to easily recognize the number of printers 14 of which the control programs 50 have been updated to the specific version and the number of printers 14 of which the control programs 50 have not been updated to the specific version.

Moreover, the first program 69 enables the administrator to recognize the serial numbers and the model names of the printers of which the versions of the control programs 50 have not been updated to the specific version and recognize the causes why the control programs 50 have failed to be updated, after making the administrator recognize the number of the printers 14 of which the control programs 50 have been updated and the number of the printers 14 of which the control programs 50 have not been updated.

Fifth Modification

In the aforementioned illustrative embodiment, an example has been described in which the first program 69 (more exactly, the CPU 61 executing the first program 69) performs the execution process (S83) in response to the scheduled update date and time being reached (S82: Yes) after the scheduled update date and time is registered onto the management database. However, the first program 69 may perform the execution process before the scheduled update date and time is reached after the scheduled update date and time is registered onto the management database. In this case, for instance, the first program 69 may add the scheduled update date and time registered on the management database to the first instruction command. The second program 29 of the external intermediary device 12 may transmit the generated second instruction command to each internal intermediary device 13 in response to the scheduled update date and time added to the first instruction command being reached. In another instance, the second program 29 of the external intermediary device 12 may add the scheduled update date and time to the second instruction command and transmit the second instruction command to each internal intermediary device 13. In this case, the third program 39 of each internal intermediary device 13 may transmit the generated third instruction command to each corresponding printer 14 in response to the scheduled update date and time added to the second instruction command being reached.

Other Modifications

In the aforementioned illustrative embodiment, an example of the case where the first program 69 receives an instruction to update the control program 50 of each specified printer 14 to the specific version has been described. However, the first program 69 may cause the display 20 of the administrator terminal 17 to display substantially the same display screens as the aforementioned second to twelfth display screens in other cases as well such as a case where the administrator selects the "Change Print Settings" icon 74 on the first display screen to receive setting values for the print settings such as "Density" and a case where the administrator selects the "Change Other Settings" icon 75 on the first display screen to receive setting values for other settings.

As described above, the management database is also stored in the memory 22 of the external intermediary device 12, and the external intermediary device 12 is a web server that publishes its URL on the Internet 15. That is, the second program 29 of the external intermediary device 12 may perform substantially the same processes as the first program 69 performs. Therefore, for instance, the management server 11 may be omitted from the communication system 10 by causing the external intermediary device 12 to have substantially the same function as of the management server 11. In another instance, the external intermediary device 12 may be omitted from the communication system 10 by causing the management server 11 to have substantially the same function as of the external intermediary device 12.

In the aforementioned illustrative embodiment, an example has been described in which the first program 69 of the management server 11 first transmits the fifth display screen data to the administrator terminal 17, and in response to the administrator selecting the "Display Non-Updated Only" icon 91 on the fifth display screen, transmits to the administrator terminal 14 the sixth display screen data representing the sixth display screen to display thereon information regarding the printers 14 of which the control programs 50 have not been updated. However, the first program 69 may transmit the sixth display screen data to the administrator terminal 17 without transmitting the fifth display screen data to the administrator terminal 17.

In the aforementioned illustrative embodiment, an example has been described in which the sixth display screen includes the text of the update result "Not Yet." However, the texts "Update" and "Not Yet" may be omitted from the sixth display screen, since it is obvious that each serial number displayed on the sixth display screen indicates the associated printer 14 of which the control program 50 has not been updated to the specific version.

In the aforementioned illustrative embodiment, an example has been described in which the administrator is allowed to select one of the serial numbers displayed on the fifth display screen or the sixth display screen by using the record frame icon 92. However, instead of the record frame icon 92, or together with the record frame icon 92, the fifth display screen and the sixth display screen may be configured to display thereon a particular icon for selecting the serial numbers of all the printers 14 of which the control programs 50 have not been updated to the specific version. In this case, when receiving from the administrator terminal 17 an HTTP request representing that the particular icon has been selected, the first program 69 of the management server 11 may obtain, from the management database, the log information on all the printers 14 of which the control programs 50 have not been updated to the specific version. Then, the first program 69 may transmit an HTTP response including all of the obtained log information to the administrator terminal 17 via the communication I/F 63 and the Internet 15.

In the aforementioned illustrative embodiment, an example has been described in which the first program 69 of the management server 11 identifies the log information corresponding to the cause information included in the received HTTP request (S69) and transmits the identified log information to the administrator terminal 17. However, the first program 69 may be configured to transmit all the log information registered in the specified records to the administrator terminal 17 without executing S69.

In the aforementioned illustrative embodiment, an example has been described in which the connection log information of one week is displayed on the seventh display screen. However, the seventh display screen may be configured to display thereon the connection log information of two weeks, one month, or three months.

The following shows examples of associations between elements exemplified in the aforementioned illustrative embodiment and modifications and elements according to aspects of the present disclosure. The management server 11 may be an example of an "information processing device" according to aspects of the present disclosure. In this case, the first program 69 may be an example of "computer-readable program instructions" according to aspects of the present disclosure. The control program 50 may be an example of a "control program" according to aspects of the present disclosure. Each of the external intermediary device 12 and the internal intermediary devices 13 may be an example of an "intermediary device" according to aspects of the present disclosure. The CPU 61 may be an example of a "processor" according to aspects of the present disclosure. The CPU 61 and the memory 62 may be included in a "controller" according to aspects of the present disclosure, and may be included in a "first controller" according to aspects of the present disclosure. The communication I/F 63 may be an example of a "communication interface" according to aspects of the present disclosure, and may be an example of a "first communication interface" according to aspects of the present disclosure. The administrator terminal 17 may be an example of a "terminal device" according to aspects of the present disclosure. The management database (see FIG. 3) may be an example of a "database" according to aspects of the present disclosure.

The serial numbers (see FIG. 3) may be an example of "printer identification number" according to aspects of the present disclosure. The information input into the entry field for the sub item "Cover Open" may be an example of "error log information" according to aspects of the present disclosure. Each of the communication I/F 33 of each internal intermediary device 13 and the communication I/F 23 of the external intermediary device 12 may be an example of a "second communication interface" according to aspects of the present disclosure. For instance, the CPU 31 and the memory 32 of each intermediary device 13 may be included in a "second controller" according to aspects of the present disclosure. In another instance, the CPU 21 and the memory 22 of the external intermediary device 12 may be included in the "second controller" according to aspects of the present disclosure. The second display screen data may be an example of "first screen data" according to aspects of the present disclosure. Further, the second display screen (see FIG. 11B) may be an example of a "first screen" according to aspects of the present disclosure. The filtering information such as the model name, the branch name, and the serial number may be an example of "specific information" according to aspects of the present disclosure. The version information of the control program 50 may be an example of a "specific setting value" according to aspects of the present disclosure. The serial numbers obtained from the records specified by the CPU 61 executing the first program 69 may be an example of "specific identification information" according to aspects of the present disclosure. The third display screen data may be an example of "second screen data" according to aspects of the present disclosure. Further, the third display screen (see FIG. 12A) may be an example of a "second screen" according to aspects of the present disclosure. The first instruction command may be an example of a "change request" according to aspects of the present disclosure, and may be an example of a "change instruction" according to aspects of the present disclosure. The offline information, the non-update notification, and the status information may be included in examples of "success-failure information" and "execution status information" according to aspects of the present disclosure. The fifth display screen data and the sixth display screen data may be included in examples of "third screen data" according to aspects of the present disclosure. Further, the fifth display screen (see FIG. 12B) and the sixth display screen (see FIG. 13A) may be included in examples of a "third screen" according to aspects of the present disclosure. The texts such as "Offline" and "Cover Open" displayed on the fifth display screen and the sixth display screen on the display 20 may be included in examples of "cause information" according to aspects of the present disclosure. The text "Offline" may be an example of "offline information" according to aspects of the present disclosure. The text "Cover Open" may be an example of "error information" according to aspects of the present disclosure. The text "Done" displayed on the fifth display screen on the display 20 may be an example of "affirmative information" according to aspects of the present disclosure. The text "Not Yet" displayed on the fifth display screen and the sixth display screen on the display 20 may be an example of "negative information" according to aspects of the present disclosure. The record frame icons 92 may be an example of "selectable objects" according to aspects of the present disclosure. The specified serial number may be an example of "selection information" according to aspects of the present disclosure. The update date, the update time, and the specified serial number may be included in examples of "update information" according to aspects of the present disclosure. The instruction to perform firmware synchronization may be an example of a "maintenance instruction" according to aspects of the present disclosure. The first icon 111 and the second icon 112 may be included in "success-failure objects" according to aspects of the present disclosure. In this case, the first icon 111 may be an example of a "first object" according to aspects of the present disclosure. Further, the second icon 112 may be an example of a "second object" according to aspects of the present disclosure. The first selection information and the second selection information may be included in examples of "success-failure selection information" according to aspects of the present disclosure. As well as the version of the control program 50, the setting values for the print settings such as "Density" may be included in examples of "setting values" according to aspects of the present disclosure. As described above, the texts "Update" and "Not Yet" may be omitted on the sixth display screen (see FIG. 13A). In this case, the serial numbers displayed on the sixth display screen may be included in the examples of the "success-failure information" according to aspects of the present disclosure, and may be an example of the "negative information" according to aspects of the present disclosure. For instance, instead of the management server 11, the external intermediary device 12 may be an example of the "information processing device" according to aspects of the present disclosure. In this case, the second program 29 may be an example of the "computer-readable program instructions" according to aspects of the present disclosure. In another instance, each internal intermediary device 13 may be an example of the "information processing device" according to aspects of the present disclosure. In this case, the third program 39 may be an example of the "computer-readable program instructions" according to aspects of the present disclosure. In yet another instance, the management server 11 and the external intermediary device 12 may be included in the "information processing device" according to aspects of the present disclosure. In this case, the first program 69 and the second program 29 may be included in the "computer-readable program instructions" according to aspects of the present disclosure.

What is claimed is:

1. A non-transitory computer-readable medium storing computer-readable program instructions executable by a processor connected with an information processing device comprising a communication interface, the program instructions being configured to, when executed by the processor, cause the processor to:
    transmit first screen data representing a first screen to a terminal device via the communication interface, the first screen being configured to receive inputs of specific information for specifying one or more printers and a specific setting value settable for the one or more printers;
    receive the specific information and the specific setting value from the terminal device via the communication interface;
    specify, as specific identification information, printer identification information associated with the received specific information among all pieces of printer identification information registered on a database;
    transmit second screen data representing a second screen to the terminal device via the communication interface, the second screen including the specific identification information and one or more setting values associated with the specific identification information on the database, the second screen being configured to receive an input of a change instruction to change the one or more setting values to the specific setting value;
    receive the change instruction from the terminal device via the communication interface;
    transmit a change request via the communication interface, the change request including the change instruction and the specific identification information;
    obtain execution status information including the specific identification information and success-failure information, each piece of the success-failure information representing whether a setting value for a corresponding printer, among the one or more setting values, has been changed to the specific setting value in accordance with the change instruction; and
    transmit third screen data representing a third screen to the terminal device via the communication interface, the third screen including the specific identification information and the execution status information.

2. The non-transitory computer-readable medium according to claim 1,
    wherein the program instructions are further configured to, when executed, cause the processor to:
        when a setting value for a printer, among the one or more setting values, has not been changed to the specific setting value, transmit the third screen data including only specific identification information representing the said printer among all pieces of the specific identification information.

3. The non-transitory computer-readable medium according to claim 1,
    wherein the execution status information further includes cause information each piece of which represents a cause why a setting value for a corresponding printer, among the one or more setting values, has not been changed to the specific setting value.

4. The non-transitory computer-readable medium according to claim 3,
    wherein each piece of the success-failure information includes one of:
        offline information representing that a connection has not been established with a corresponding printer;
        success information representing that the setting value for the corresponding printer has been changed to the specific setting value; and
        failure information representing that the setting value for the corresponding printer has not been changed to the specific setting value, and
    wherein the program instructions are further configured to, when executed, cause the processor to:
        when the success-failure information for a printer includes the offline information, determine the offline information as the cause information for the said printer; and
        when the success-failure information for the said printer includes the failure information, determine error information included in the offline information as the cause information for the said printer.

5. The non-transitory computer-readable medium according to claim 3,
    wherein the program instructions are further configured to, when executed, cause the processor to:
        transmit the third screen data representing a screen including the success-failure information, the specific identification information, the cause information, and one or more selectable objects, to the terminal device via the communication interface;

receive selection information representing that an object has been selected from among the one or more selectable objects, from the terminal device via the communication interface;

obtain log information representing a log of status information of a printer specified by the selected object among the one or more printers identified by the specific identification information, the specified printer being associated with the success-failure information representing that the setting value for the specified printer has not been changed to the specific setting value; and transmit fourth screen data representing a fourth screen including the obtained log information, to the terminal device via the communication interface.

6. The non-transitory computer-readable medium according to claim 5, wherein each piece of the success-failure information includes one of:
offline information representing that a connection has not been established with a corresponding printer;
success information representing that the setting value for the corresponding printer has been changed to the specific setting value; and
failure information representing that the setting value for the corresponding printer has not been changed to the specific setting value, wherein the information processing device further comprises a memory storing the database, the database storing the printer identification information each piece of which is associated with:
online log information representing a period of time during which a connection was established with an associated printer;
offline log information representing a period of time during which the connection was not established with the associated printer; and
error log information representing a log of errors that occurred in the associated printer, and wherein the program instructions are further configured to, when executed, cause the processor to:
when the success-failure information for the specified printer includes the offline information, obtain, as the log information, the online log information and the offline log information associated with specific identification information of the specified printer on the database; and
when the success-failure information for the specified printer includes the failure information, obtain, as the log information, the error log information associated with the specific identification information of the specified printer on the database.

7. The non-transitory computer-readable medium according to claim 1, wherein the program instructions are further configured to, when executed, cause the processor to:
after transmission of the third screen data, receive update information from the terminal device via the communication interface; and
perform one of:
transmitting, via the communication interface, the change instruction and specific identification information of a printer for which the setting value has not been changed to the specific setting value, at a timing represented by the received update information; and
transmitting, via the communication interface, the change instruction, the update information, and the specific identification information of the printer for which the setting value has not been changed to the specific setting value.

8. The non-transitory computer-readable medium according to claim 1, wherein the program instructions are further configured to, when executed, cause the processor to:
transmit the specific information and fourth screen data representing a fourth screen to the terminal device via the communication interface, the fourth screen being configured to receive an input of the specific setting value;
receive the specific information and the specific setting value via the communication interface;
specify, as the specific identification information, the printer identification information associated with the received specific information among all pieces of the printer identification information registered on the database;
transmit fifth screen data representing a fifth screen to the terminal device via the communication interface, the fifth screen including the specific identification information and the one or more setting values associated with the specific identification information on the database, the fifth screen being configured to receive a maintenance instruction to maintain the one or more setting values to be the specific setting value;
receive the maintenance instruction via the communication interface;
receive status information via the communication interface, the status information including the one or more setting values for the one or more printers;
determine whether each of the one or more setting values included in the received status information is identical to the specific setting value;
when determining that a setting value, among the one or more setting values, is not identical to the specific setting value, transmit a change request via the communication interface, the change request including specific identification information associated with the setting value determined not to be identical to the specific setting value, the change instruction, and the specific setting value; and
after transmission of the change request, obtain the execution status information, and transmit the third screen data to the terminal device via the communication interface.

9. The non-transitory computer-readable medium according to claim 1, wherein the one or more setting values for the one or more printers include at least one of:
a print setting value for each printer; and
a version of a control program executable by each printer.

10. The non-transitory computer-readable medium according to claim 1, wherein the program instructions are further configured to, when executed, cause the processor to:
generate fourth screen data representing a fourth screen including success-failure objects, based on the obtained success-failure information, the success-failure objects representing a count of printers that have executed the change instruction and a count of printers that have not executed the change instruction;

transmit the generated fourth screen data to the terminal device via the communication interface;

receive success-failure selection information representing that one of the success-failure objects has been selected; and transmit the third screen data in response to receiving the success-failure selection information.

11. The non-transitory computer-readable medium according to claim 10, wherein the success-failure objects include:
a first object representing the count of printers that have executed the change instruction; and
a second object representing the count of printers that have not executed the change instruction, and wherein the program instructions are further configured to, when executed, cause the processor to:
when the first object is selected, receive, as the success-failure selection information, first selection information representing that the first object has been selected;
when the second object is selected, receive, as the success-failure selection information, second selection information representing that the second object has been selected;
in response to receiving the first selection information, transmit the third screen data including the specified identification information of each printer that has executed the change instruction; and
in response to receiving the second selection information, transmit the third screen data including the specified identification information of each printer that has not executed the change instruction.

12. A non-transitory computer-readable medium storing computer-readable program instructions executable by a processor connected with an information processing device comprising a communication interface, the program instructions being configured to, when executed by the processor, cause the processor to:

transmit first screen data representing a first screen to a terminal device via the communication interface, the first screen being configured to receive inputs of specific information for specifying one or more printers and a specific setting value settable for the one or more printers;

receive the specific information and the specific setting value from the terminal device via the communication interface;

specify, as specific identification information, printer identification information associated with the received specific information among all pieces of printer identification information registered on a database;

transmit second screen data representing a second screen to the terminal device via the communication interface, the second screen including the specific identification information and one or more setting values associated with the specific identification information on the database, the second screen being configured to receive an input of a maintenance instruction to maintain the one or more setting values to be the specific setting value;

receive the maintenance instruction from the terminal device via the communication interface;

receive status information via the communication interface, the status information including the one or more setting values for the one or more printers;

determine whether each of the one or more setting values included in the received status information is identical to the specific setting value;

when determining that a setting value, among the one or more setting values, is not identical to the specific setting value, transmit a change request via the communication interface, the change request including specific identification information associated with the setting value determined not to be identical to the specific setting value, a change instruction to change the setting value to the specific setting value, and the specific setting value;

obtain execution status information including the specific identification information and success-failure information, each piece of the success-failure information representing whether a setting value for a corresponding printer, among the one or more setting values, has been changed to the specific setting value in accordance with the change instruction; and transmit third screen data representing a third screen to the terminal device via the communication interface, the third screen including the specific identification information and the execution status information.

13. An information processing device comprising:
a communication interface; and
a controller configured to:
transmit first screen data representing a first screen to a terminal device via the communication interface, the first screen being configured to receive inputs of specific information for specifying one or more printers and a specific setting value settable for the one or more printers;
receive the specific information and the specific setting value from the terminal device via the communication interface;
specify, as specific identification information, printer identification information associated with the received specific information among all pieces of printer identification information registered on a database;
transmit second screen data representing a second screen to the terminal device via the communication interface, the second screen including the specific identification information and one or more setting values associated with the specific identification information on the database, the second screen being configured to receive an input of a change instruction to change the one or more setting values to the specific setting value;
receive the change instruction from the terminal device via the communication interface;
transmit a change request via the communication interface, the change request including the change instruction and the specific identification information;
obtain execution status information including the specific identification information and success-failure information, each piece of the success-failure information representing whether a setting value for a corresponding printer, among the one or more setting values, has been changed to the specific setting value in accordance with the change instruction; and
transmit third screen data representing a third screen to the terminal device via the communication interface, the third screen including the specific identification information and the execution status information.

14. The information processing device according to claim 13,
wherein the controller comprises:
a processor; and
a memory storing computer-readable program instructions configured to, when executed by the processor, cause the processor to:
transmit the first screen data to the terminal device via the communication interface;
receive the specific information and the specific setting value from the terminal device via the communication interface;
specify the printer identification information as specific identification information;
transmit the second screen data to the terminal device via the communication interface;
receive the change instruction from the terminal device via the communication interface;
transmit the change request via the communication interface;
obtain the execution status information; and
transmit the third screen data to the terminal device via the communication interface.

15. A communication system comprising:
a management server; and
an intermediary device communicably connected with the management server,
wherein the management server comprises:
a first communication interface; and
a first controller configured to:
transmit first screen data representing a first screen to a terminal device via the first communication interface, the first screen being configured to receive inputs of specific information for specifying one or more printers and a specific setting value settable for the one or more printers;
receive the specific information and the specific setting value from the terminal device via the first communication interface;
specify, as specific identification information, printer identification information associated with the received specific information among all pieces of printer identification information registered on a database;
transmit second screen data representing a second screen to the terminal device via the first communication interface, the second screen including the specific identification information and one or more setting values associated with the specific identification information on the database, the second screen being configured to receive an input of a change instruction to change the one or more setting values to the specific setting value;
receive the change instruction from the terminal device via the first communication interface;
transmit a change request via the first communication interface, the change request including the change instruction and the specific identification information;
obtain execution status information including the specific identification information and success-failure information, each piece of the success-failure information representing whether a setting value for a corresponding printer, among the one or more setting values, has been changed to the specific setting value in accordance with the change instruction; and
transmit third screen data representing a third screen to the terminal device via the first communication interface, the third screen including the specific identification information and the execution status information, and
wherein the intermediary device comprises:
a second communication interface; and
a second controller configured to:
receive the change instruction via the second communication interface;
establish communication with the one or more printers;
transmit the received change instruction to the one or more printers via the second communication interface;
receive affirmative information or negative information from each of the one or more printers via the second communication interface, each piece of the affirmative information representing that a setting value for a corresponding printer has been changed to the specific setting value, each piece of the negative information representing that a setting value for a corresponding printer has not been changed to the specific setting value; and
transmit the success-failure information to the management server via the second communication interface, each piece of the success-failure information including the affirmative information, the negative information, or offline information representing that the communication has not been established with a corresponding printer.

* * * * *